United States Patent [19]

Yamakawa

[11] Patent Number: 4,706,130
[45] Date of Patent: Nov. 10, 1987

[54] IMAGE RECORDING APPARATUS UTILIZING LIGHT EMITTING DIODES WITH PIXEL SHAPE CORRECTION

[75] Inventor: Tadashi Yamakawa, Yokohama, Japan

[73] Assignee: Canon Kabushiki Kaisha, Tokyo, Japan

[21] Appl. No.: 9,107

[22] Filed: Jan. 29, 1987

Related U.S. Application Data

[63] Continuation of Ser. No. 636,492, Aug. 1, 1984, abandoned.

[30] Foreign Application Priority Data

Aug. 8, 1983 [JP] Japan .................................. 58-143700
Aug. 8, 1983 [JP] Japan .................................. 58-143701
Aug. 8, 1983 [JP] Japan .................................. 58-143702
Aug. 8, 1983 [JP] Japan .................................. 58-143703
Aug. 8, 1983 [JP] Japan .................................. 58-143704
Dec. 23, 1983 [JP] Japan .................................. 58-242105

[51] Int. Cl.[4] .................... H04N 1/21; H04N 1/23; G01D 15/06
[52] U.S. Cl. .................................. 358/296; 346/154; 358/300
[58] Field of Search ............... 358/296, 300, 301, 302; 346/107 R, 110 R, 154, 160, 161

[56] References Cited

U.S. PATENT DOCUMENTS 3,838,359 9/1974 Hakki et al. ........................... 372/45
4,499,501 2/1985 Eriksen et al. ....................... 358/302
4,563,747 1/1986 Tidd ................................. 358/296 X

FOREIGN PATENT DOCUMENTS 59514 9/1982 European Pat. Off. .

Primary Examiner—E. A. Goldberg
Assistant Examiner—Patrick W. Foster
Attorney, Agent, or Firm—Fitzpatrick, Cella, Harper & Scinto

[57] ABSTRACT

There is disclosed an image recording apparatus in which an image is read with an image sensor such as CCD and is supplied to light emitting diodes as recording elements for recording on an electrophotographic drum. The image data from the image sensor are stored in plural memories in parallel manner. A control circuit is provided for controlling the drive signals applied to each of the diodes, to drive such diodes a plural number of times in accordance with image signals applied thereto.

15 Claims, 30 Drawing Figures

IMAGE RECORDING APPARATUS UTILIZING LIGHT EMITTING DIODES WITH PIXEL SHAPE CORRECTION

This application is a continuation of application Ser. No. 636,492 filed Aug. 1, 1984, now abandoned.

BACKGROUND OF THE INVENTION

1. Field of the Invention

The present invention relates to an image recording apparatus for image recording on a recording material with plural recording elements, and more particularly to such image recording apparatus for dot recording with light emitting diodes as recording elements.

2. Description of the Prior Art

FIG. 1 schematically shows an example of a digital copier equipped with a recording unit for image recording with plural recording elements.

An original document placed on an original carriage 20 is illuminated with an illuminating unit composed for example of a halogen lamp, and the reflected light is guided through mirrors 3, 4, and focused, by a lens 5, onto an image sensor 6 containing a linear array of plural photoreceptor elements. Said mirror 3 scans the original with a speed V in synchronization with the rotating speed of a photosensitive drum 7, and the mirror 4 is displaced with a speed V/2 to maintain a constant optical path length from the original to the lens 5. Consequently on the image sensor 6 there is formed, in successive manner, an image of a line of the pixels of the original image, thus generating image data of a line.

Along the periphery of the photosensitive drum 7 there are provided a high-voltage charger 8, a developing unit 9, a transfer charger 10, a cleaner 11 etc., and an LED array head 12 containing plural light-emitting diodes over the width of the photosensitive drum 7 is positioned perpendicular to the rotating direction thereof and at the downstream side of the high-voltage charger 8 with respect to the rotating direction indicated by an arrow. The light from the linear LED array is focused on the photosensitive drum 7 by an imaging unit 13.

The light-emitting diodes in said LED array 12 are turned on or off according to the image data of a line generated by said image sensor 6, and the light spots falling on the photosensitive drum generate an electrostatic latent image on said drum which is uniformly charged by the high-voltage charger 8. Said latent image is developed by the developing unit 9, and the developed image is transferred onto a sheet supplied between the transfer charger 10 and the photosensitive drum 7 and is fixed by heat or by pressure in a fixing unit 14 to obtain a copy of the original.

In such electrophotographic process, the dot corresponding to a lighted LED can be arbitrarily reproduced as black or white, by a suitable combination of the polarity of the toner and of the charging voltage. Stated differently, whether or not to deposit the toner on the drum illuminated by LED can be arbitrarily determined by the combination of the polarity of the charger and of the toner. The image sensor 6 is composed of a photoreceptor area containing an array of photoreceptor elements of a number corresponding to the number of pixels in a line for generating electric signals in response to the amounts of light falling thereon, and a signal shift area for serially releasing the electric signals received from said photoreceptor elements. In general such image sensor can be composed of a CCD image sensor mentioned before or a MOS image sensor. In the former, the charges corresponding to the amounts of light are supplied in parallel to a CCD shift register and are shifted by means of the shift function of the CCD for conversion into image voltage data. In the latter, the output signals from the photoreceptor elements are selected in succession by MOS switches and are converted into image voltage data.

FIG. 2 shows the electric connection between the image sensor 6 and the LED array head 12. In the image sensor 6, a linear array of m photoreceptor elements 21-1–21-m, composed for example of photodiodes, supplies electric signals corresponding to the received light in parallel manner to a shift register 22 to obtain, from a serial output terminal SO thereof, output signals corresponding to the received light which are converted into voltage signals by an amplifier 23. On the other hand, the LED array lead 12 has a linear array of m LED's 24-1–24-m, of which cathodes are grounded in common while anodes are respectively connected to the output terminals of drivers 25. The input terminals of said drivers are respectively connected to the output terminals of latches 26, of which input terminals are connected respectively to the parallel output terminals of a shift register 27. The serial output signals from the image sensor 6 are supplied to a binary encoding circuit 28 to obtain binary data for turning on or off the corresponding LED's in consideration of various conditions such as the magnitude of the received light, values of neighboring pixels, position of the pixel in consideration etc. The binary output signals are supplied to a shift input terminal S1 of the shift register 27 of the LED array head 12. A timing generator 29 determines the timing for parallel data entry from the photoreceptor element array 21 into the shift register 22, timing of data shift output from the shift register 22, timing of data input into the shift register 27 of the LED array head 12, and timing of simultaneous latching of data of a line in the shift register 27 by the latches 26 for turning on or off the LED's 24-1–24-m.

Consequently the LED 24-1 is turned on or off according to the intensity of light received by the photoreceptor element 21-1, and similarly the LED's 24-2–24-m are turned on or off respectively according to the light intensities received by the photoreceptor elements 21-2–21-m. ICK and OCK are clock signals, and ISG and OLG are gate timing signals of the shift registers 22, 27, respectively.

Thus, in response to a line image of the original formed on the image sensor 6, the LED's of the LED array head 12 are turned on or off according to the image density, thus forming an electrostatic latent image on the photosensitive drum 7 to enable copying of the original as explained before.

In the above-described system, the copied image is constituted by the dots irradiated by the LED's 24-1–24-m. Consequently the LED's 24-1–24-m should be made as small as possible in order to obtain a high image quality in the copied image. On the other hand, the LED's 24-1–24-m should be of a number at least covering the sheet width perpendicular to the direction of sheet feeding, for simultaneous recording of a line.

As a good image quality generally requires about 16 dots or pixels per millimeter, a copy of A3 size, in case of longitudinal feeding, requires 297 mm×16=4,752 LED's to be arranged at a density of 16 LED's per millimeter. Even in A4-size copying by longitudinal feeding, there are required about 4,000 LED's. Consequently, for the A3-size copying with longitudinal feeding mentioned above, there are required 4,752 independent drivers 25 and latches 26, and the shift register 27 has to be of a capacity of 4,752 bits. If these components are provided outside the LED head 12, the anode input terminals of the LED's have to be connected to the outside, but it is practically extremely difficult to extract more than 4,000 leads. It is therefore considered to form the shift register, latches, drivers etc. with integrated circuits and mount the same on the LED head 12.

However, though the use of integrated circuits allows mounting of said components on the head, a satisfactory high-speed operation cannot be achieved with a shift register as long as 4,752 bits. As an example, in case of producing about 40 copies per minute in A4 size with transversal feeding, each sheet has to be moved with a speed of about 270 mm/sec. In this case it is necessary to generate $270 \times 16 = 4,320$ lines of dots per second, so that the data have to be transferred at least at a rate of $4,320 \times 4,752 \approx 2 \times 10^7$ bits per second, or 20 Mbps. If the aforementioned integrated circuits are prepared for example with the I$^2$L process, the clock rate of the shift register is in the order of 1 Mbps. Consequently the conventional structure only allows to obtain several copies per minute, and is unable to exploit the advantage of high-speed electrophotographic copying process.

On the other hand, in case of placing dot-forming elements at a high density such as 16 elements per millimeter, the connections between said elements and driving elements have to be placed on one side of the dot-forming elements in case the parallel output signals from the shift register are connected with said dot forming elements through drivers as shown in FIG. 2, but it is extremely difficult in the practice to form connections with a density of 16 lines per millimeter.

Although the shift registers, latches, and drivers may be dividedly placed on both sides of the dot forming elements, it becomes necessary in such case to distribute the output signals from the binary encoding circuit to the shift registers of both sides bit by bit, and such distributing circuit cannot be formed on the printer head. There are therefore required complicated outside wirings.

Also, in case the image sensor 6 is composed of a CCD image sensor which is inevitably limited in size, the optical system has to be of a large dimension since the image of the original has to be focused on the CCD image sensor after size reduction through the optical system in order to read the image of a line. The optical system can be reduced in size, if a photoreceptor element array of a width same as that of the original is available, by focusing the image of the original on the photoreceptor element array in actual size for example through a rod lens array. However, it is not possible to linearly align plural CCD linear image sensors by cutting off the end portions of such sensors and leaving only the effective areas thereof. It is therefore proposed to provide a linear image sensor capable of reading the image of a line in actual size by arranging plural CCD linear image sensors in a staggered pattern, though a line on the original cannot be read at the same time.

In such case, since neighboring CCD linear image sensors are aberrated by plural dot lines on the original, there is required a memory for storing image data of said plural lines in order to reproduce the original with the conventional dot line printer head equipped with dot forming elements of a line. There is thus required a complicated expensive control circuit for the dot line printer head.

On the other hand, there is already known, as shown in FIG. 3, an LED printer head containing a linear array of a plurality of LED's. In such LED printer head, said linearly arranged plural LED's are divided into plural blocks each containing a determined number of LED's. For example, in order to record 4,096 dots, there can be employed an LED printer head composed of 64 LED chips each constituting a block of 64 LED's. These LED's are subjected to dynamic drive by switching in the unit of blocks in successive manner by means of switching elements such as transistors. In FIG. 3 there is shown an LED substrate 102 on which mounted in a multi-layered printed circuit board 103 having matrix wirings composed of multiple layers of epoxy resins or ceramic materials, and on said circuit board 103 mounted are LED chips LC1-LC64. A common electrode of each of the LED chips LC1-LC64, each containing a determined number of LED's, is positioned on the bottom face of the chip and is connected with one of common leads CB1-CB64 provided on the multi-layered circuit board 103. Segment electrodes of the 4096 LED's L1-1, L1-2, . . . , L64-64 in the LED chips LC1-LC64 are bonded with wires to segment matrix wirings 104*a*, 104*b*.

FIG. 4 is a partial magnified view of the bondings between said segment matrix wirings 104*a*, 104*b* and the LED chips LC1-LC64. The anodes of the LED's L2-1, L2-2 of the LED chip LC2 are connected within the chip with wirings CW2-1, CW2-2, which are connected through bonding wires BW2-1, BW2-2 with segment lead bands SB2-1, SB2-2. In insulating layers 105*a*, 105*b*, said segment lead bands SB2-1, SB2-2 are respectively connected with segment bus lines SBL1, SBL2 through holes H2-1, H2-2. Though the foregoing explanation is limited to LED's L2-1, L2-2 in the LED chip LC2, it is to be understood that similar connections are made to other LED's L1-1-L64-64. The segment bus lines SBL1-SBL64 are connected to a printer head driving circuit through cables 106*a*, 106*b* composed for example of flexible printed circuit boards as shown in FIG. 3.

FIG. 5 shows a known circuit for driving the LED printer head described above. In FIG. 5 there are shown an LED printer head 101; a video signal input terminal T1 for entering serial pixel data signals 107; a terminal T2 for entering clock signals 108; a terminal T3 for entering a video enable signal; a 64-bit shift register 110 for storing the pixel data signals 107 in synchronization with the clock signals 108; a 64-bit latch circuit 111; a 64ry counter 112 for counting the clock signals 108; a delay circuit 113; a 64ry counter 114; a decoder 115; and switching elements SA1-SA64, SB1-SB64 for driving the LED printer head 101 in succession. The LED printer head 101 contains 4096 LED's which are divided into 64 blocks each containing 64 LED's.

In the following there will be given an abbreviated explanation on the function of the LED printer utilizing the above-described driving circuit.

(1) First 64 bits of the serial pixel data signals 107 are entered into the shift register 110, and are stored in the latch circuit 111 in response to a count-up signal 116 of the 64ry counter 112 to be released later.

(2) The switching elements SB1-SB64 are respectively turned on or off according to the output signal of the latch circuit 111. Subsequently a latch clear signal 117 released from the delay circuit 113 clears the latch circuit 111, whereby all the switching elements SB1–SB64 return to the off state.

(3) The output signal of the 64ry counter 114 counting the number of latch clear signals 117 is supplied to the decoder 115, thereby turning on one of the switching elements SA1–SA64 for driving a determined LED block or chip. The switching elements SA1–SA64 and SB1–SB64 are controlled in synchronization with the clock signals 108 and the video enable signal 109.

(4) The foregoing steps (1) to (3) are repeated 64 times to reproduce 4096 (=64×64) pixels by the LED printer head 101. In this manner the dynamic drive corresponding to a scanning line is completed.

In forming a latent image corresponding to the original image by irradiating the photosensitive drum with the above-described LED printer head 101, the light emission from the LED's has to be increased in order to increase the image forming speed. Though the light emission can be increased to a certain extent by increasing the driving current for the LED's, an LED chip will require a current of 3.2 A in case all the LED's are turned on with a driving current of 50 mA per LED. In such case the current in each of the segment bus lines SBL1–SBL64 is 50 mA at maximum, but a pulse current of 3.2 A with a duty ratio of 1:64 flows in each of the wirings W1–W64 leading from the common electrodes of the LED chips LC1–LC64 to the switching elements SA1–SA64 through common lead bands CB1–CB64. 4096 LED's provide an image width of 256 mm with a pixel density of 16 pixels/mm. However, in order to achieve an image forming speed of 200 mm/sec. corresponding to about 30 sheets/min. in A4 size in the Japan Industrial Standards, the switching elements SA1–SA64 are required to switch a current of 3.2 A with a pulse duration of ca. 4.9 μsec. Because of the inductances present in the connections between the switching elements SA1–SA64 on the driver board and the common lead bands CB1–CB64 on the LED printer head 101, the current in each LED chip shows a slight lag after the switching element is turned on. Consequently the light emissions from the LED's L1-1–L64-64 become lower even if the peak current in each LED is equal to 50 mA. However, in case only one LED is lighted in each LED chip, such loss in the light emission is not observed since the current in the common electrode is limited to 50 mA, thus ensuring a rectangular wave form. In this manner the light emission per LED varies according to the number of lighted LED's in each chip. In addition the resistances in the wirings W1–W64 leading from the common lead bands CB1–CB64, there are generated voltage drops between the common electrodes the LED chips and the switching elements according to the current flowing therebetween. In order to reduce the influence of such inductances and impedances there should be employed thick wirings, but it is practically difficult to employ 64 thick wirings as a set. Consequently such LED printer head can only be employed in a low-speed LED printer with a low light emission and with a small total current per LED chip.

On the other hand, in order to obtain a print with A3 size with a pixel density of 16 pixels/mm, there is required an array of ca. 4,800 LED's for covering the shorter side of ca. 300 mm of the A3 size. More specifically, a total length of 296 mm can be covered with 4,736 LED's divided for example into 37 LED blocks each containing 128 LED's. In case of matrix drive of such 37 LED blocks, the lighting time of an LED block is only 1/37 of the time required for printing pixels of a line. Also in case of using 64 LED blocks each containing 64 LED's as explained above, the lighting time of an LED block is only 1/64.

Consequently, in comparison with a case of connecting drivers and latches in parallel manner to 4,736 LED's and releasing image signals of a line in parallel manner from a serial-to-parallel converter of 4,736 bits to turn on or off the LED's in response to said image signals over the entire pixel printing period for the line, the LED's are required to a 37-times stronger intensity for a same printing speed.

The LED array chip employed in the conventional LED printer head is principally made of GaAsP, and has an output power of ca. 8 μW with a driving current of 10 mA per LED, for a pixel density of 16 pixels/mm and at a wavelength of 650 nm. On the other hand the converging fiber array for focusing the light onto the photosensitive drum only has an efficiency of ca. 10% at maximum. Consequently an energy of ca. 1 $\mu J/cm^2$ is required even with a photosensitive drum having a high sensitivity in the region of 650 nm. In this case the image formation be relative standstill relation of the photosensitive drum and the LED array chip requires about 49 μsec. In case of the matrix drive of the LED array chips mentioned above, the printing time for a line is increased by 37 times and becomes equal to 1.8 msec. This time, being required for printing 1/16 mm, corresponds to a printing speed of ca. 34.5 mm/sec. or ca. 12 seconds per A3-sized copy. In order to reduce this printing time to the order of 4 seconds, the light emission has to be increased 3 times by a corresponding increase in the driving current for LED's. However, such increase in the driving current curtails the service life of the LED. For example, in order to ensure, after a use of 100 hours, a light intensity of at least 60% of the initial intensity, the current density in the LED should not exceed 200–300 $A/cm^2$ for a maximum junction temperature of 80° C. The area of an LED for achieving a density of 16 pixels/mm is 62.5×62.5 μm, so that a current of 10 mA induces a current density of 356 $A/cm^2$. Thus a current exceeding 10 mA is undesirable also in consideration of the service life of LED.

If each LED is driven with a current of ca. 30 mA without the consideration on the service life, the current required in the common electrode for lighting all the LED's in each block amounts to 3.84 A. Also the active period for each block is ca. 16 μsec, for printing A3 size in 4 seconds. However the high-speed switching of a current as large as 3.84 A inevitably involves a delay of several microseconds. Said delay time depends on the magnitude of current, so that the light intensity from each LED fluctuates according to the number of lighted LED's in each block. The conventional printer head cannot therefore provide a high image quality, and can only be utilized in low-speed printers.

SUMMARY OF THE INVENTION

In consideration of the foregoing, an object of the present invention is to provide a high-speed image recording apparatus capable of providing a high resolving power.

Another object of the present invention is to provide an image recording apparatus allowing easy wiring operation and capable of high-density image recording.

Still another object of the present invention is to provide an image recording apparatus adapted for image recording with image data obtained by contact image reading.

Still another object of the present invention is to provide an image recording apparatus capable of effectively eliminating unevenness in the image recording density.

Still another object of the present invention is to provide an image recording apparatus allowing easy inspection and maintenance.

Still another object of the present invention is to provide an image recording apparatus allowing satisfactory image reproduction.

Still another object of the present invention is to provide an image recording apparatus adapted for image recording with light-emitting elements such as light-emitting diodes.

Still another object of the present invention is to provide an image recording apparatus adapted for use in a digital copier.

The foregoing and still other objects of the present invention and the advantages thereof will become fully apparent from the following description.

BRIEF DESCRIPTION OF THE DRAWINGS

FIGS. 15 and 17 are perspective views showing still other connecting methods wherein FIG. 15 shows a structure in which the grounding terminal is placed on the switching element while FIG. 17 shows another structure in which the grounding terminal is placed under the switching element;

DETAILED DESCRIPTION OF THE PREFERRED EMBODIMENTS

The present invention will now be clarified in detail by embodiments thereof shown in the attached drawings.

There is at first explained a first embodiment enabling satisfactory image recording through the recording of a plurality of pixels per unit area and achieving high-speed recording operation.

Figure 2:
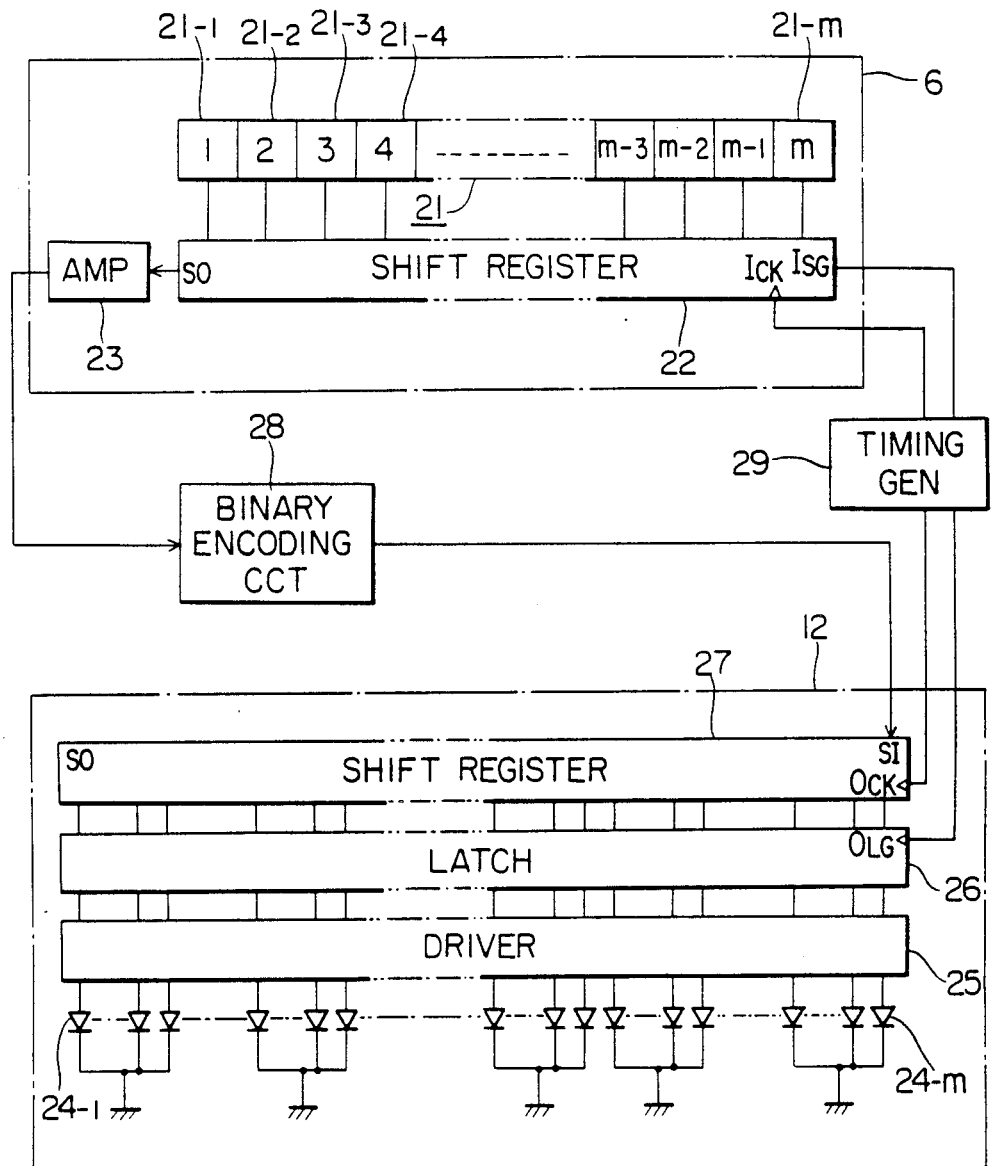
FIG. 2 is a view of electrical connections between a conventional linear image sensor and an LED array printer head.

In said embodiment there are employed, instead of a shift register for storing all the pixel data corresponding to a line as shown in FIG. 2, plural LED blocks each containing a determined number of recording elements and plural shift registers corresponding to said blocks, said shift registers being driven in parallel manner.

In the following description plural LED's are employed as plural recording elements for image recording.

Figure 6:
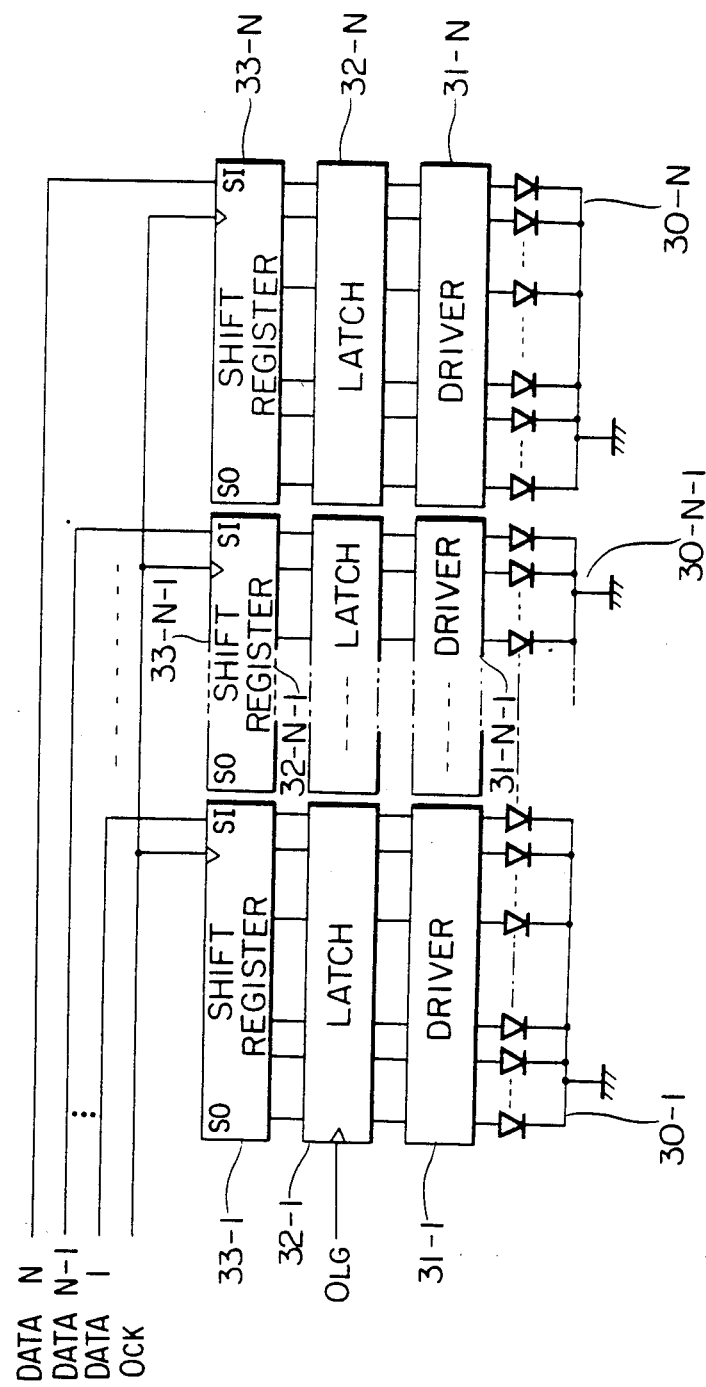
FIG. 6 is a circuit diagram showing a first embodiment of the LED array printer head of the present invention.

FIG. 6 shows an example of the LED array in the present embodiment, wherein LED's 30 of a number M are arranged in a linear array divided into N blocks each containing a determined number of LED's. The cathodes of said LED's are all grounded. The anodes of the LED's in each block are connected to the output terminals of one of N drivers 31-1–31-N, of which input terminals are respectively connected to N latches 32-1–32-N, of which input terminals are in turn connected to N shift registers 33-1–33-N. Thus, for forming a line with M pixels, there are employed M LED's, and each of the shift registers 33-1–33-N has a capacity of M/N bits. In such structure, data of a line are stored in the shift registers 33-1–33-N by supplying data of M/N pulses through data lines DATA1–DATAN in parallel manner, in synchronization with the signals on a clock line OCK. Subsequently a pulse is supplied through a strobe line OLG to latch said line data, thus turning on or off the LED's 30 through the drivers 31. During image formation by said turning on or off of the LED's, the data of a succeeding line are stored in the shift registers 33-1–33-N by the supply of M/N pulses through the lines DATA1–DATAN.

Figure 7:
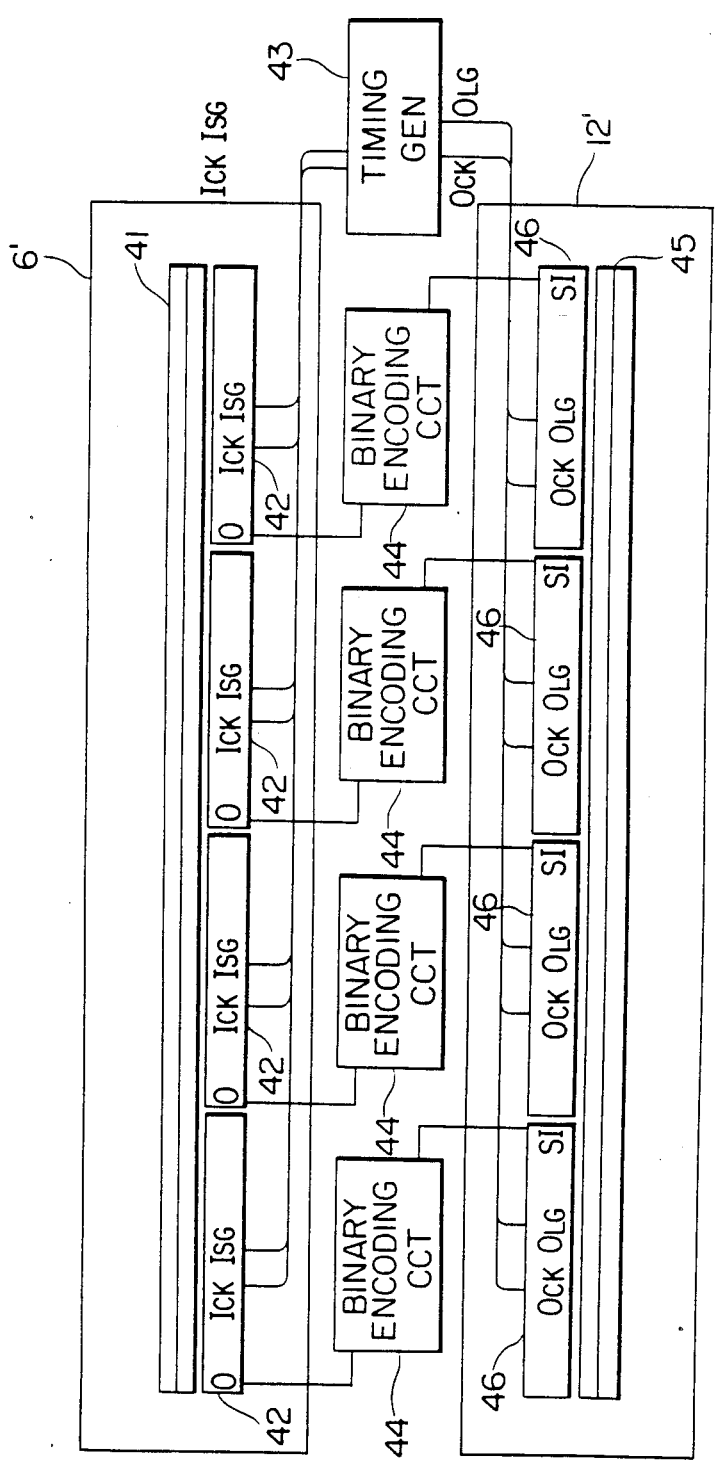
FIG. 7 is a schematic view showing the principle of said image sensor and the LED array printer head of FIG. 6 applied to a digital copier.

FIG. 7 shows an embodiment in which the structure shown in FIG. 6 is applied to a digital copier and illustrates the principle of drive of an image sensor 6' and an LED array printer head 12' divided into four blocks. The image sensor 6' contains a linear array of M photoreceptor elements 41. Each of driving circuits 42 for the photoreceptor element array drives ¼ of the photoreceptor elements, and releases serial voltage signals from an output terminal O in response to the light intensities received by the photoreceptor elements and in synchronization with timing signals ICK, ISG supplied from a timing generator 43. A binary encoding circuit 44 compares the voltage supplied from the output terminal O of the control circuit 42 with a reference voltage and accordingly releases a black level signal "1" or a white level signal "0".

The LED array 12' has a light-emitting unit 45 containing a linear array of M light-emitting elements (LED). Each of LED driving circuits 46 including a shift register, a latch and a driver drives ¼ of said LED's.

The output terminal of each binary encoding circuit 44 is connected to the terminal SI of corresponding LED driving circuit 46, whereby data are supplied into the shift register in synchronization with clock signals OCK from the timing generator 43. Upon completion of storage of the data of a line, the latch signal OLG is supplied from the timing generator 43 to latch said data, thus activating the light-emitting elements.

As explained in the foregoing, it is rendered possible to provide an image forming apparatus capable of high-speed image formation relying on image data read by an image sensor, through the use of plural memory means and plural drive means respectively corresponding thereto.

The data of M pixels constituting a line can be shifted by M/N clock signals. Consequently the transfer clock rate for the image data can be reduced, and the use of high-speed circuit elements can be dispensed with.

The above-described driving method for the LED array printer head is applicable not only to the output data from the image sensor but also to the output image data from word processors, computers or the like.

In the following there will be explained a second embodiment providing a further improvement on the instrumentation. In the structure shown in FIG. 2, there are required plural wirings of a very high density between the shift register and plural LED's. Also high density wirings are unavoidable since all the signals from a shift register have to be supplied to the linear array of LED's from one side thereof.

In said second embodiment, said wiring density can be lowered by positioning the signal lines on both sides of the LED array. Also such structure enables high-speed recording of a high-quality image.

Figure 8:
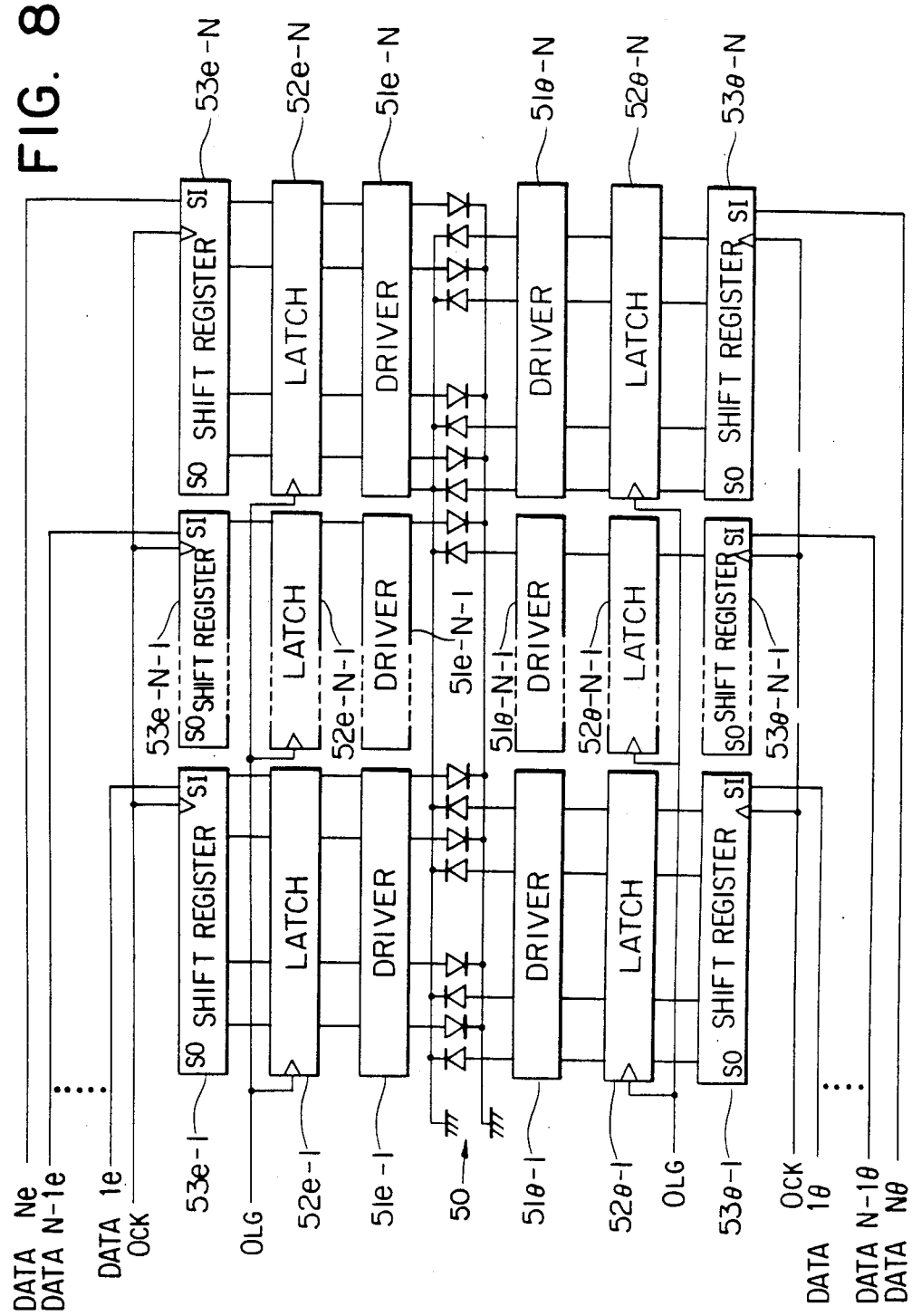
FIG. 8 is a circuit diagram showing a second embodiment of the LED array printer head of the present invention.

Now there will be given an explanation on the second embodiment of the present invention while making reference to FIG. 8 showing an example of the LED array printer head to be employed in the present embodiment, in which LED's 50 of a number M are arranged in a linear array, with the cathodes thereof grounded. The anodes of said LED's are alternately connected to the output terminals of 2N drivers 51θ-1–51θ-N and 51e-1–51e-N positioned on both sides, on which input terminals are respectively connected to the output terminals of latches 52θ-1–52θ-N, 52e-1–52e-N of which input terminals are in turn respectively connected to the output terminals of shift registers 53θ-1–53θ-N, 53e-1–53e-N.

Thus, for forming a line with M pixels, there are employed M LED's and each of the shift registers 53θ-1–53θ-N, 53e-1–53e-N has a capacity of M/2N bits. In such structure, data of a line are stored in the shift registers 53θ-1–53θ-N, 53e-1–53e-N by supplying data of M/2N pulses through data signal lines Data1θ–DataNθ, Data1e–DataNe in parallel manner, in synchronization with the signals on clock lines OCK. Subsequently a pulse is supplied through strobe line OLG to latch said line data, thus selectively turning on the LED's 50 through the drivers 51θ-1–51θ-N, 51e-1–51e-N. During image formation by said selective turning on of the LED's, the data of a succeeding line are stored in the shift registers 53θ-1–53θ-N, 53e-1–53e-N by the supply of M/2N pulses through the data lines Data1θ–DataNθ, Data1e–DataNe.

Figure 9:
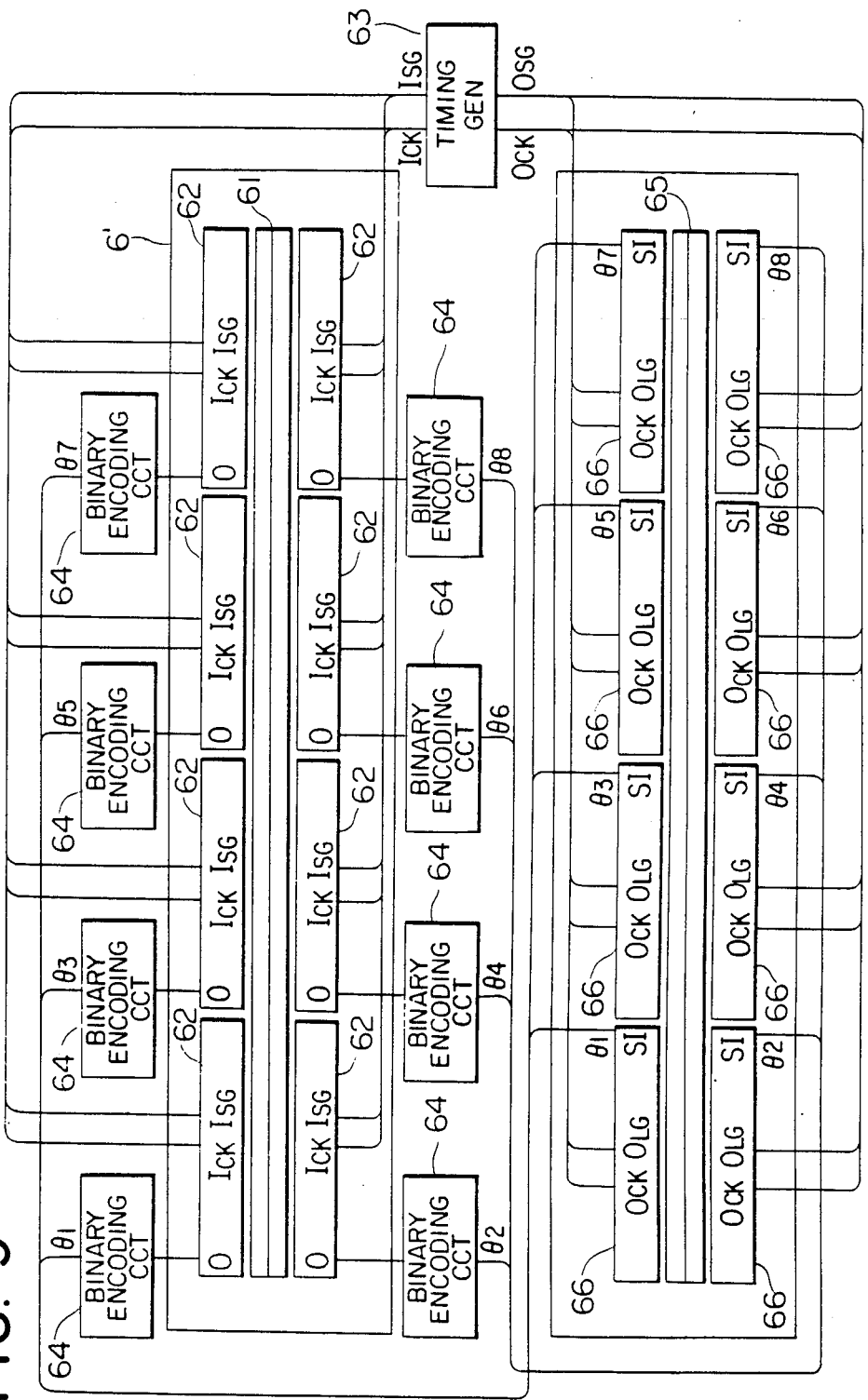
FIG. 9 is a schematic view showing the principle of the linear image sensor and the LED array printer head of FIG. 8 applied to a digital copier.

FIG. 9 shows an embodiment in which the structure shown in FIG. 8 is applied to a digital copier and illustrates the principle of drive of an image sensor 6' and an LED array printer head 12', of which wirings are formed on both sides are divided into four blocks on each side.

The image sensor 6' contains a linear array of M photoreceptor elements 61. Each of driving circuits 62 for the photoreceptor element array drives ⅛ of the photoreceptor elements, and releases serial voltage signals from an output terminal O in response to the light intensities received by the photoreceptor elements and in synchronization with timing signals ICK, ISG supplied from a timing generator 63. A binary encoding circuit 64 compares the voltage supplied from the output terminal O of the control circuit 62 with a reference voltage and accordingly releases a black level signal "1" or a white level signal "0".

The LED array 12' has a light-emitting unit 65 containing a linear array of M light-emitting elements. Each of LED driving circuit 66, containing shift registers 63θ-1–63θ-4, 63e-1–63e-4, latches 62θ-1–62θ-4, 62e-1–62e-4, and drivers 61θ-1–61θ-4, 61e-1–61e-4 drives ⅛ of said LED's.

The output terminal of each binary encoding circuit 64 is connected to the terminal SI of corresponding LED driving circuit 66, whereby data are supplied into the shift register in synchronization with clock signals OCK from the timing generator 63. Upon completion of storage of the data of a line, the latch signal OLG is supplied from the timing generator 63 to latch said data, thus activating the light-emitting elements.

As explained in the foregoing, it is rendered possible to provide an image forming apparatus capable of high-speed image formation relying on image data read by an image sensor, through the use of plural memory means and plural drive means respectively corresponding thereto.

The foregoing embodiment is again applicable not only to the output data from the image sensor but also to the output image data from word processors, computers or the like.

Also the arrangement of signal lines from both sides of the LED array printer head allows to reduce the wiring density to a half, thus allowing easier designing, inspection and maintenance.

Figure 10A:
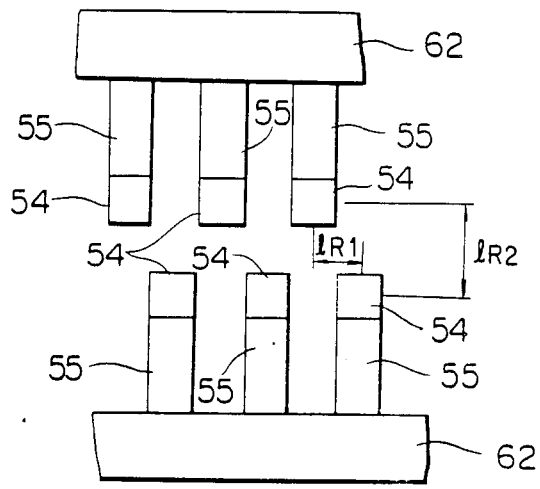
FIGS. 10(a) and (b) are schematic views showing electrical connections wherein the embodiment shown in FIG. 8 is applied to staggered arrangements of the elements.
Figure 10B:
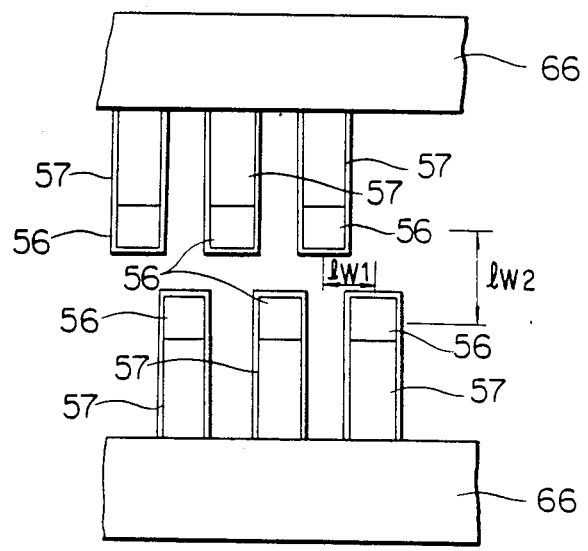

In the foregoing embodiments the plural light-emitting elements (LED) are linearly positioned, but it is also possible, as shown in FIG. 10(a), to position the photoreceptor elements 54 in a staggered arrangement and to connect the same alternatively with the control circuits 62 on both sides through wirings 55. In such case LED's 56 in the LED array printer head 12' are similarly positioned as shown in FIG. 10(b) and are alternately driven by driving circuits 66 on both sides.

Such arrangement eliminates the gap between the neighboring LED's, thus achieving a higher density of the LED's along the direction of array and enabling improved image recording. Also such arrangement facilitates manufacture of the printer head.

In the foregoing explanation each driver drives every other LED, but it is also possible that each driver drives every two or three LED's.

Figure 1:
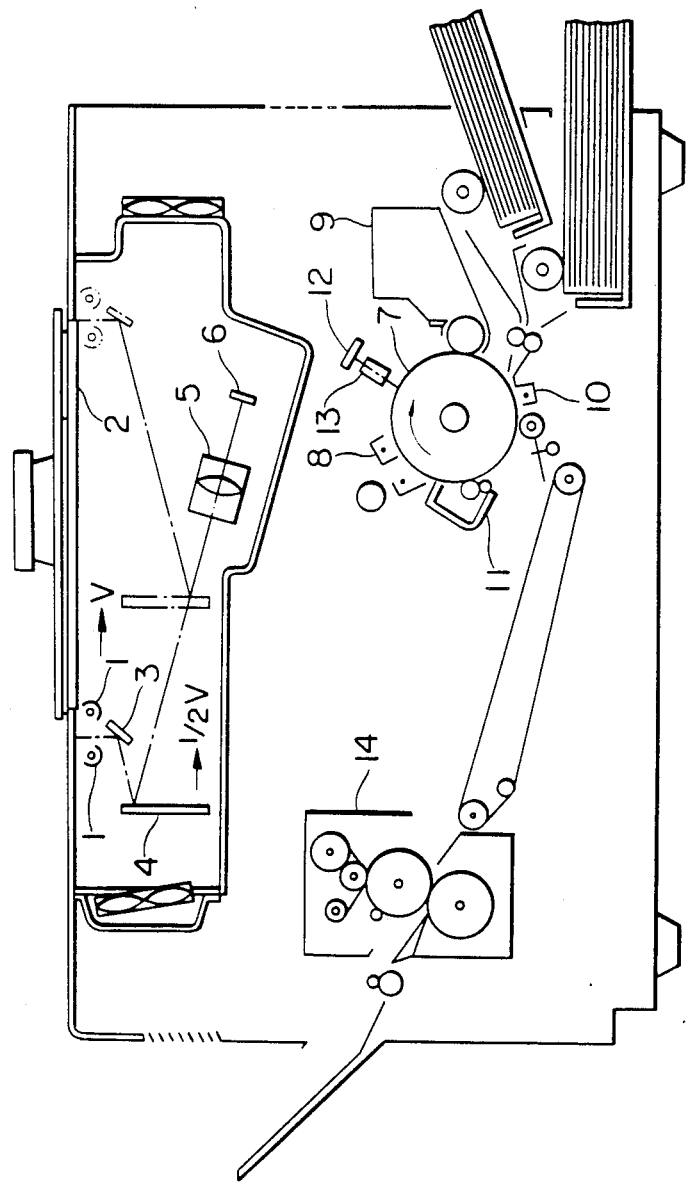
FIG. 1 is a schematic view of an example of a conventional digital copier.

Now there will be explained a case of utilizing, instead of an image sensor which is shorter than the width of the original and on which the original image is projected through a reduction optical system as shown in FIG. 1, a long sensor containing plural photoreceptor elements arranged over a length at least equal to the reading width of the original and conducting the image recording with the signals obtained with such sensor. Such structure has the advantage of reducing the dimension of image reading unit. However, the linear image sensors cannot be arranged in practice linearly over such a long width, the image sensor of a width equal to that of the original is generated produced by a staggered arrangement of plural CCD linear image sensors.

In such case, as the neighboring image sensors are separated by a distance corresponding to plural dot lines on the original to be read, there is required a memory for storing pixel data of said plural dot lines in order to reproduce the original with a conventional linear printer head having a linear array of dot generating elements. Such structure requires a complicated control circuit for the printer head and inevitably becomes expensive.

Figure 11:
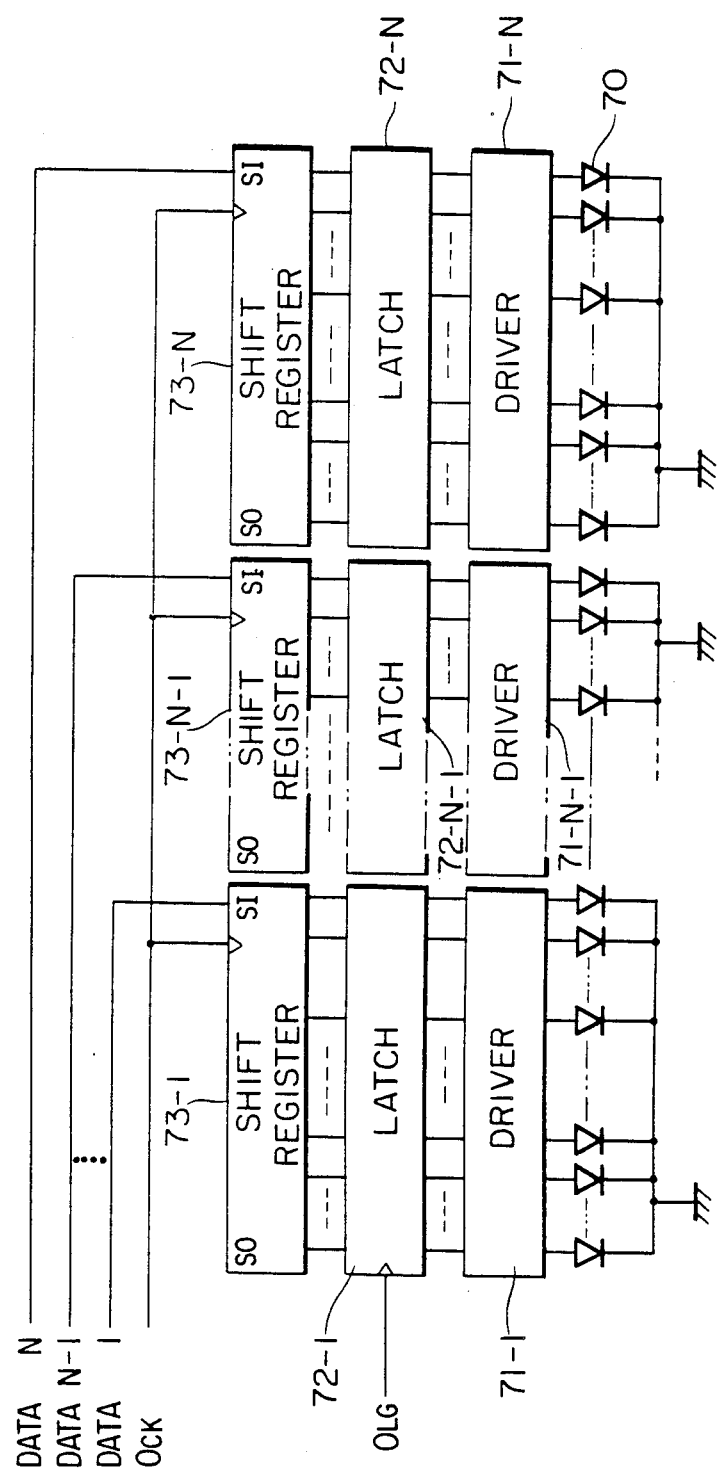
FIG. 11 is a circuit diagram showing a third embodiment of the LED array printer head of the present invention.

The above-described drawback is resolved in a third embodiment of the present invention, which will be explained in the following in relation to FIG. 11 showing an example of the LED array to be employed in said embodiment. In said embodiment plural LED's 70 are arranged in a linear array, with the cathodes thereof grounded. The anodes of said LED's are connected to the output terminals of N drivers 71-1–71-N of which input terminals are respectively connected to the output terminals of N latches 72-1–72-N, of which input terminals are in turn respectively connected to the output terminals of N shift registers 73-1–73-N. Thus, for forming a line with M pixels, there are employed M LED's and each of the shift registers 73-1–73-N has a capacity of M/N bits. In such structure, data of a line are stored in the shift registers 73-1–73-N supplying data of M/N pulses through data signal lines Data1–DataN in parallel manner, in synchronization with the signals on a clock line OCK. Subsequently a pluse is supplied through a strobe line OLG to latch said line data, thus selectively turning on the LED's 70 through the drivers 71. During image formation of a line by said selective turning on of the LED's, the data of a succeeding line are stored in the shift registers 73-1–73-N by the supply of M/N pulses through the data lines Data1–DataN.

Figure 12:
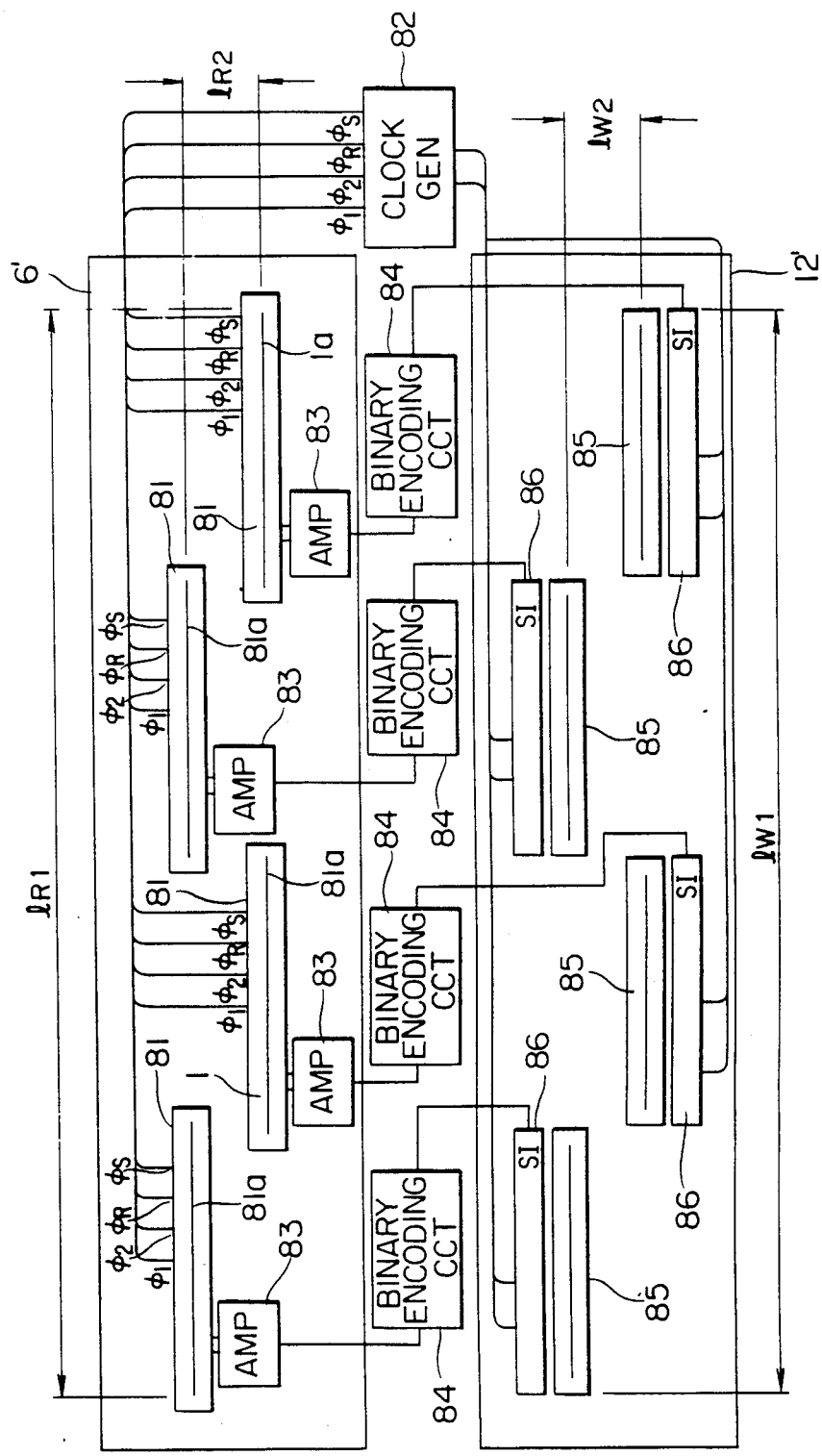
FIG. 12 is a schematic view showing the principle of said image sensor and the LED array printer head of FIG. 11 applied to a digital copier.

FIG. 12 shows an embodiment in which the structure shown in FIG. 11 is applied to a digital copier, and illustrates the principle of drive of an image sensor 6' composed of four CCD image sensors 81 arranged in staggered array and an LED array printer head 12'.

Each CCD image sensor 81 contains a linear array 81a of the photoreceptor elements and transfers the charges generated in said array corresponding the light intensities received therein to a CCD channel in parallel manner, in response to a shift gate signal $\phi s$ supplied from a clock generator 82. Thereafter the pixel data obtained in the photoreceptor element array 81a are serially released in synchronization with transfer signals $\phi 1$, $\phi 2$ and a reset signal $\phi R$. An amplifier 83 converts the data from the CCD image sensor 81 into a voltage level identifiable in a binary encoding circuit 84.

The photoreceptor element array 81a of a neighboring CCD image sensor 81 is placed in staggered position in such a manner that the pixel data over the entire width of the original can be read by the effective lengths of the arrays without any gap therebetween. Each array has a length lR1 and the photoreceptor element arrays 81a of the neighboring CCD image sensors are separated by a distance lR2.

On the other hand, the LED array printer head 12' is provided with light-emitting units 85 each containing a linear array of LED's of a number equal to that of the photoreceptors in the array 81a, as the dot forming elements for reproducing the image read by the CCD image sensor 81, said light-emitting units 85 being arranged in the same manner as the CCD image sensors 81 in the image sensor 6'. Said arrangement is made in such a manner that the dots over the entire width of the original can be reproduced without gap by the connection of said dot forming elements in the transversal direction. Each unit has a length lW1, and the neighboring units 85 are separated by a distance lW2.

In case the image sensor 6' is designed for receiving the image of actual size, there are selected conditions lR1=lW1 and lR2=lW2. On the other hand, if the image sensor 6' is designed to receive an image reduced in size by an optical system, there are selected a condition lR1/lR2=lW1/lW2. In this manner there is maintained a similitude between the arrangement of the photoreceptor element arrays 81 and that of the light-emitting units 85.

Binary encoding circuits 84 discriminate black or white level and correspondingly release signal "1" or "0".

Each of four LED driver circuits 86, provided with shift registers 73-1–73-4, latches 72-1–72-4 and drivers 71-1–71-4 drives ¼ of the light-emitting units 85 covering the entire width of the original. The output terminal of each binary encoding circuit 84 is connected to the terminal SI of corresponding LED driver circuit 86, whereby data are supplied into the shift register in synchronization with clock signals OCK from the timing generator 82. Upon completion of storage of the data of a line corresponding to each block, the latch signal OLG is supplied from the timing generator 82 to latch said line data of each block, thus activating the light-emitting elements for dot formation.

As explained in the foregoing, the photoreceptor elements and the LED's for reproducing the pixels of a line are equally divided into N blocks, and in each block there are provided means for serially releasing the output data from the photoreceptor elements, a circuit for binary encoding said output data, a shift register for receiving said binary encoded data for parallel output, a latch and a driver for activating the LED's in parallel manner. Consequently the copying of a line can be achieved with an apparent clock rate which is N times larger than the clock rate of the shift registers.

In addition, even in case of utilizing an image reading system in which the linear image sensor blocks are alternately displaced in a direction perpendicular to the direction of dot line so that the pixel data of a line are obtained with a time difference between the neighboring blocks, it is rendered possible to dispense with a memory circuit for storing the image data of plural dot olines corresponding to the distance between the neighboring blocks, thus preventing the increase in the cost, by arranging the dot forming elements in a similar manner as the photoreceptor elements. Thus, particularly in case of utilizing an image sensor designed to receive an image equal in size to the original image, the image reading system can be made extremely compact, enabling to obtain a compact copier or the like.

Now there will be explained a structure capable of resolving difficulties in the manufacture in achieving high-density image recording. As already explained in the foregoing, in case of driving plural LED's, a dynamic drive for a sub-block of LED's is preferable in consideration of the circuit structure and the recording speed.

However, as also explained before, the required current may vary according to the number of LED's to be simultaneously subjected to dynamic drive, and the light emissions from the LED's may become uneven by the influence of stray inductance and impedance in the signal lines for driving LED's.

Consequently the use of simple wire bondings in the connections between the LED's and the driving circuits may hinder to achieve high-speed high-density recording.

Figure 3:
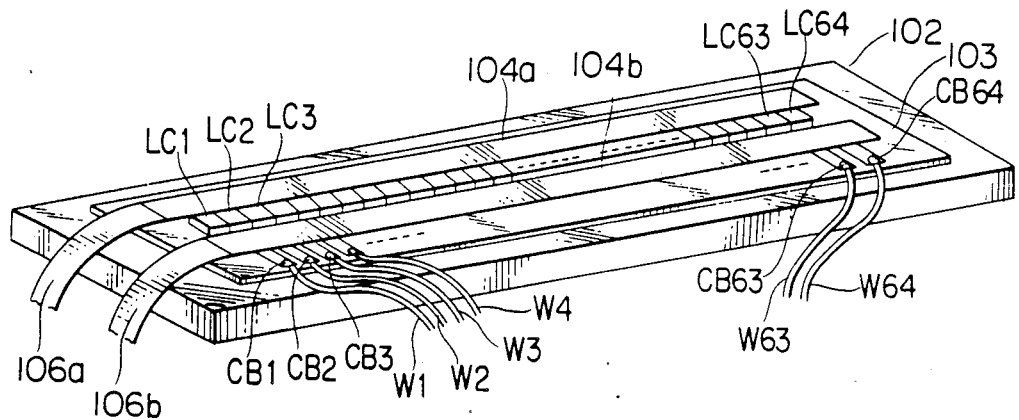
FIG. 3 is a schematic perspective view of a conventional LED printer.
Figure 4:
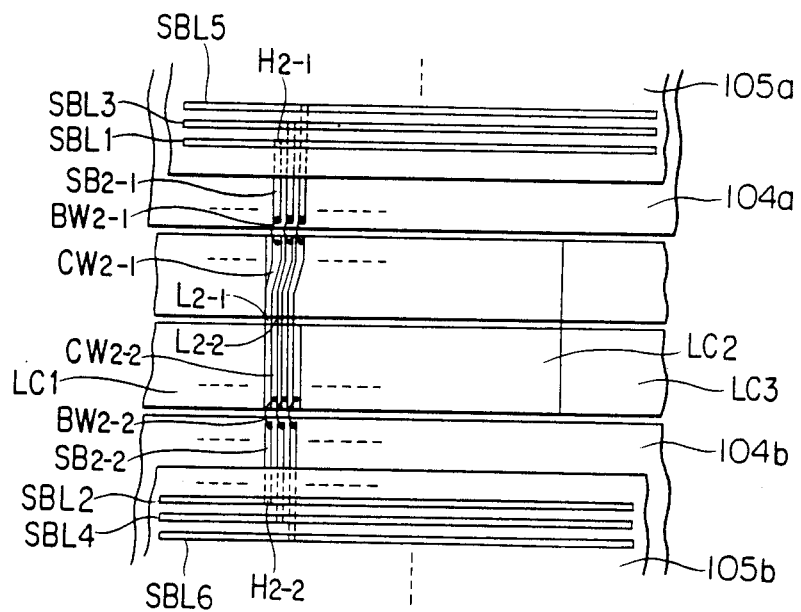
FIG. 4 is a magnified view showing the connections of an LED chip shown in FIG. 3.
Figure 5:
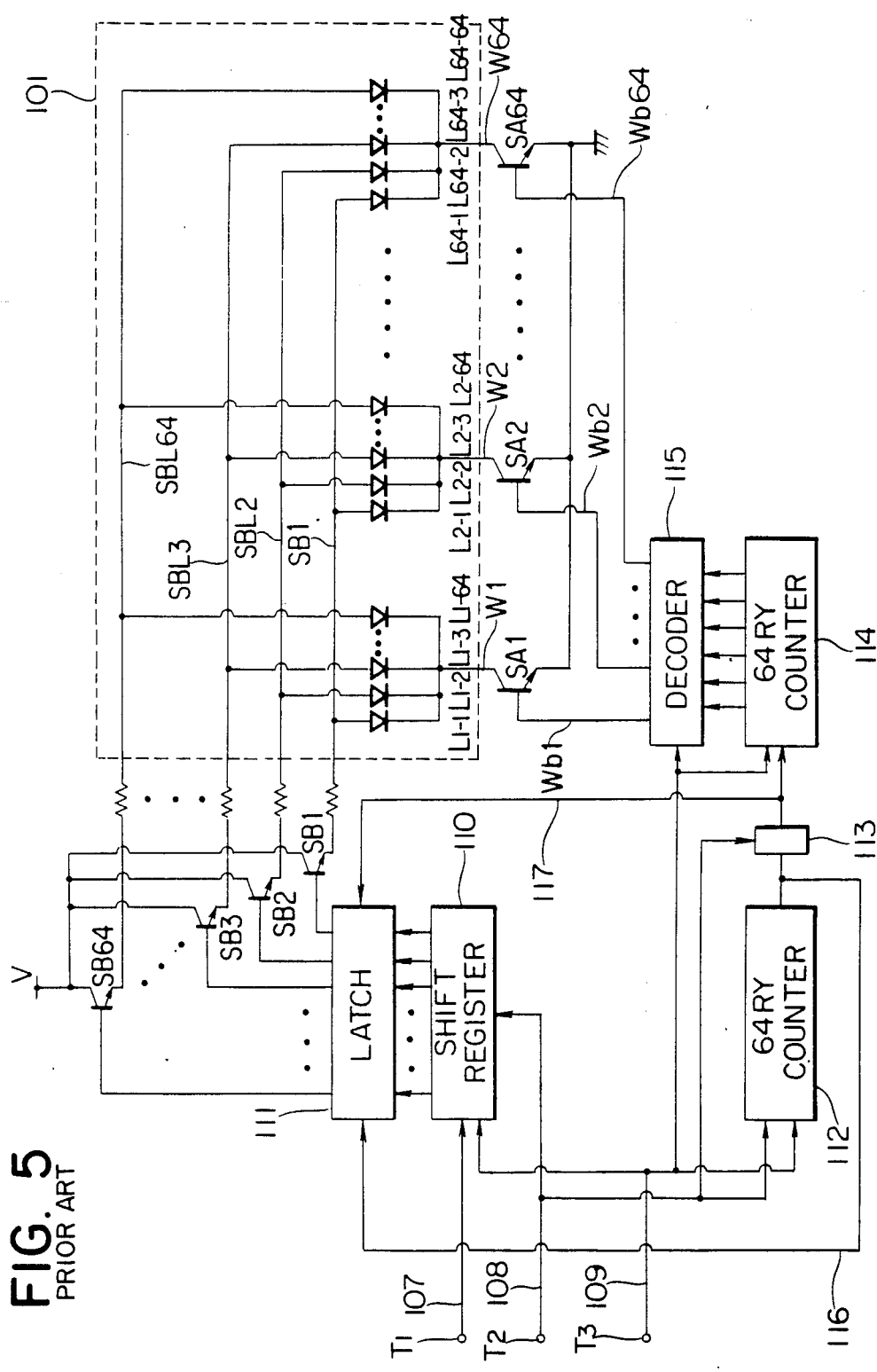
FIG. 5 is a block diagram showing a driving circuit for the LED array printer head shown in FIG. 3.
Figure 13:
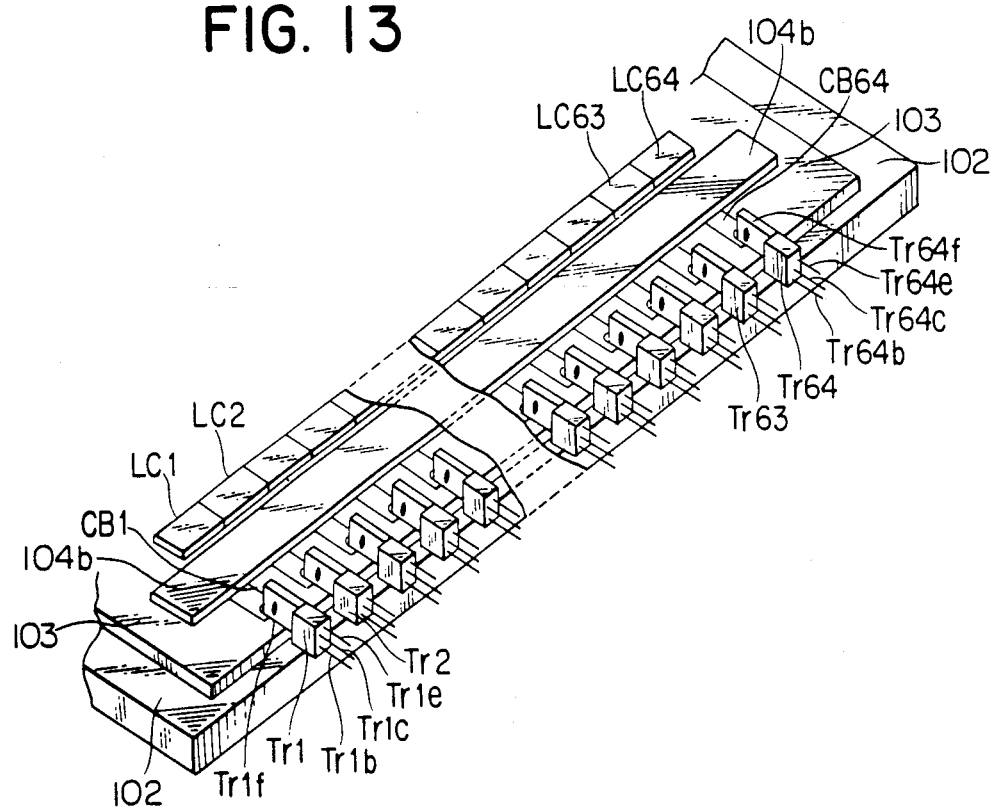
FIG. 13 is a perspective view showing a fourth embodiment of the LED array printer head.

Such drawback can be resolved by a fourth embodiment of the present invention which will be explained in the following in relation to FIG. 13, showing a perspective view of an LED array printer head to be employed in said fourth embodiment, wherein the components same as or equivalent to those shown in FIGS. 3 to 5 are represented by same numbers, i.e. an LED substrate 102, a multi-layered circuit board 103 and a segment matrix wirings 104.

In FIG. 13, power transistors Tr1–Tr64 function as switching means corresponding to the switching elements SA1–SA64 shown in FIG. 5. Heat radiating fins Tr1f–Tr64f of said transistors Tr1–Tr64 are directly soldered to lead bands CB1–CB64 of the common electrodes of LED chips LC1–LC64 constituting image forming means of divided block structure. In general the collector terminal of a power transistor is connected with the heat radiating fin, so that the conventional wirings from the common lead bands can be dispensed with. In this manner the LED chips LC1–LC64 and the collectors Tr1c–TR64c of the transistors Tr1–Tr64 are connected at determined positions on the multi-layered circuit board 103 of the printer head. The bases and emitters Tr1b–Tr64b, Tr1e–Tr64b of said transistors Tr1–Tr64 can be connected through printed circuit boards, or soldering or wrapping. In making said connections, the emitters Tr1e–Tr64e should be grounded through conductors of a sufficiently large cross section, while the bases Tr1b–Tr64b do not need conductors of such large cross section.

The LED array printer head of the above-described structure can be driven by the driving circuit shown in FIG. 5. In such case, the inductances and the impedances in the connections between the common lead bands of the LED chips LC1–LC64 to the transistors Tr1–Tr64 or the switching elements SA1–SA64 can be reduced. It is therefore rendered possible to minimize the undesirable influence of distortion in the wave form or of voltage drop which appears corresponding to the magnitude of the driving currents in said connections, thus enabling to obtain constant light emission from the LED's. The connections WB1–Wb64 between the bases Tr1b–Tr64b of the transistors Tr1–Tr64 and the driver circuits or decoding circuit 115 shown in FIG. 5 can be made of conductors of a small cross section, since said connections only accomodate gate currents at the switching operations.

Figure 14:
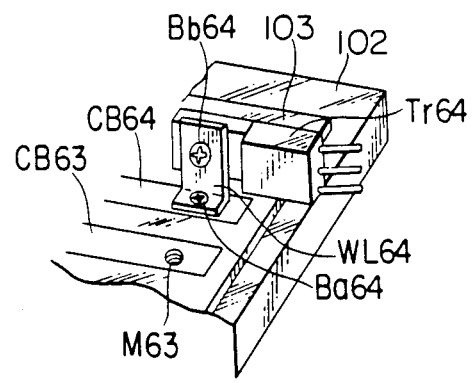
FIG. 14 is a perspective view showing another connecting method.

FIG. 14 is a partial perspective view showing another connecting method. In this method, the common lead bands CB1–CB64 are provided with screw holes M1–M64. L-shaped plates WL1–WL64 are connected at one ends thereof to said common lead bands by means of screws Ba1–Ba64, and are connected at the other ends thereof to the heat radiating fins TR1f–Tr64f of the transistors Tr1–Tr64 by means of screws Bb1–Bb64 engaging with holes provided in said fins, thereby making connections between said fins connected with the collectors Tr1c–Tr64c of the transistors Tr1–Tr64 and the common lead bands CB1–CB64. In this manner it is rendered possible to arbitrarily attach or detach the LED array printer head 101 to or from the driver circuits or power transistors, thus avoiding the inconvenience of lack of such freedom in case the transistors Tr1–Tr64 are soldered to the common lead bands CB1–CB64 and other leads of the transistors are also bonded directly to the printed circuit board containing driver circuits as shown in FIG. 13.

Figure 15:
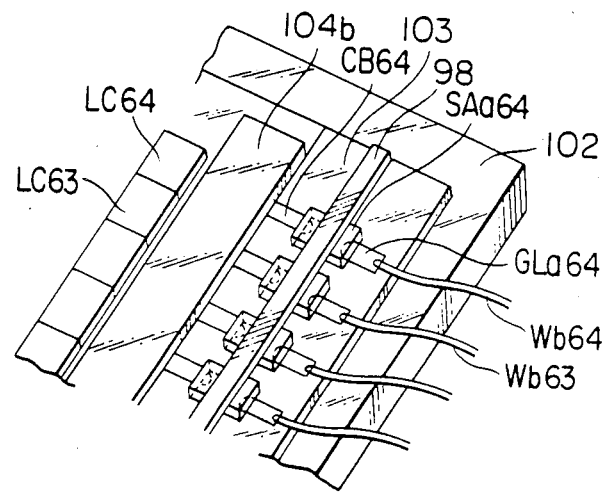
Figure 16:
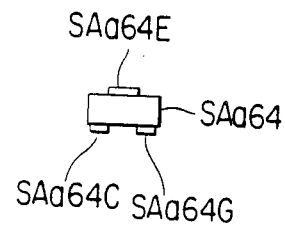
FIG. 16 is a cross-sectional view of the switching element shown in FIG. 15.
Figure 17:
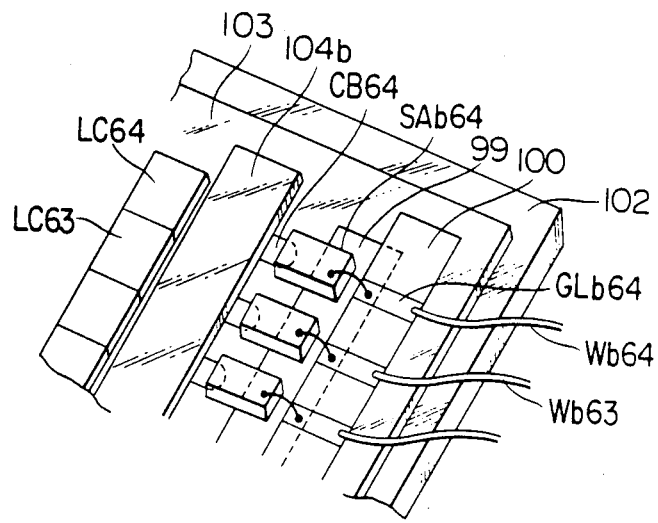
Figure 18:
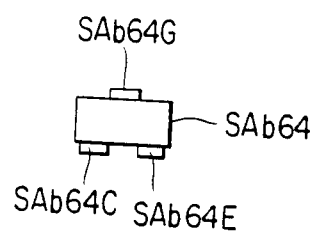
FIG. 18 is a cross-sectional view of the switching element shown in FIG. 16.

FIGS. 15 and 17 are perspective views showing still other connecting methods, in which switching elements without outer package are bonded on the LED array printer head 101, wherein FIG. 15 shows a case of employing switching elements SAa1–SAa64 with grounded emitter terminals at the top, while FIG. 17 shows a case of employing switching elements SAb-1–SAb64 with emitter terminals at the bottom. FIGS. 16 and 18 respectively show the cross sectional structure of said switching elements SAa1–SAa64 and SAb-1–SAb64, wherein SAa1C–SAa64C, SAb1C–SAb64C are terminals to be switched, SAa1E–SAa64E, SAb-1E–SAb64E are terminals to be grounded, and SAa1-G–SAa64G, SAb1G–SAb64G are gate terminals.

In the example shown in FIG. 15, common lead bands CB1–CB64 and gate signal lands GLa1–GLa64 are provided on the multi-layered circuit board 103 and are connected to switching elements SAa1–SAa64, of which upper grounding terminals SAa1E–SAa64E are connected to a grounding bus 98. Gate signal bondings Wb1–WB64 need not be thick if said grounding bus 98 is made of a conductor with a sufficiently large cross section.

In the example shown in FIG. 17, the switching elements SAb1–SAb64 are mounted on the grounding bus 99 and the common lead bands CB1–CB64, and gate terminals SAb1G–SAb64G of said elements are bonded to date signal lands GLb1–GLb64 formed on an insulating layer 100.

In case the terminals of a switching element are positioned on one face thereof, the grounding terminal is positioned at the center, and the grounding bus 98 shown in FIG. 15 is formed under said face. Although not illustrated, molding may be applied to protect the elements such as the switching elements or LED's. However, the LED lighting control with a large driving current per LED is rendered possible even in dynamic drive, by directly mounting the switching elements with outer casings on the LED array printer head and supplying only a small current in the signal lines connected to the outside circuit.

The switching elements may be composed of power transistors or any other elements performing on-off function in response to gate signals.

As explained in the foregoing, there is provided an image forming apparatus capable of high-speed image formation through dynamic drive of image forming means with an increased driving current, by dividing plural image forming means into blocks each containing a determined number of image forming elements and by driving said image forming means in successive manner in each block through switching means.

It is also rendered possible to eliminate the inconvenience of unstable light emission from the LED resulting from the change in the number of lighted LED's in dynamic drive in the block containing a determined number of LED's.

Figure 19:
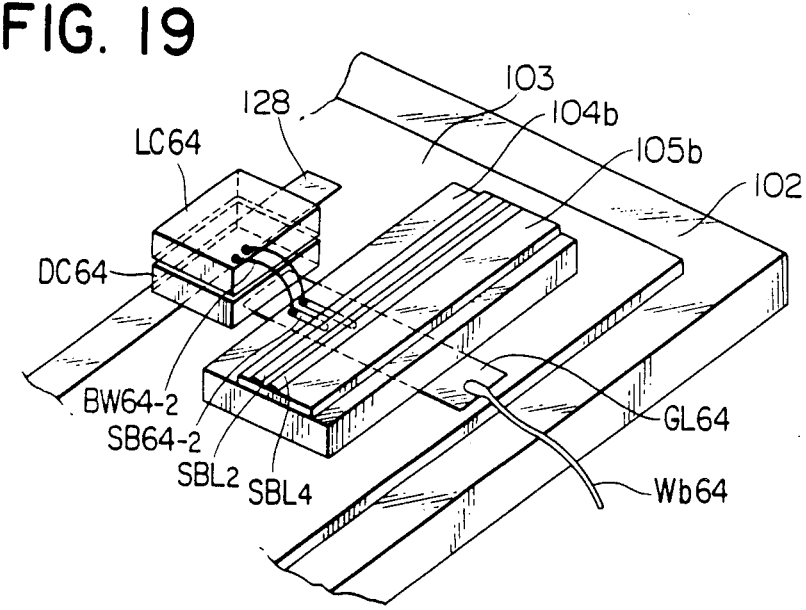
FIG. 19 is a perspective view of a fifth embodiment of the present invention.

Now there will be explained a fifth embodiment of the present invention shown in FIG. 19, which enables a further reduction in the distance between the LED array and the driving circuits, thus more markedly exhibiting the effects explained in relation to FIGS. 13 to 18. In FIG. 19, the components same as or equivalent to those shown in FIGS. 3 to 5 are represented by same numbers, i.e. an LED substrate 102, a multi-layered circuit board 103 and a segment matrix wirings 104.

FIG. 19 is a partial schematic perspective view of said embodiment, switching elements DC1-DC64, composed of NPN transistors in the present embodiment and provided on the multi-layered circuit board 103, drive LED chips LC1-LC64 and correspond to the switching elements SA1-SA64 shown in FIG. 5. Said switching elements DC1-DC64 are so mounted that the switching terminals thereof are positioned above and the terminals to be connected to the common electrodes of the LED chips LC1-LC64 are positioned below. The LED chips LC1-LC64 are superposed on the switching elements DC1-DC64, and the common electrodes thereof are connected to the switching terminals of said elements DC1-DC64. There are also shown a grounding bus 128 connected to the emitter terminals of the switching elements DC1-DC64, and gate signal lands GL1-GL64 connected to the gating base terminals of the switching elements DC1-DC64, corresponding to the common lead bands CB1-CB64 explained in the foregoing.

Figure 20:
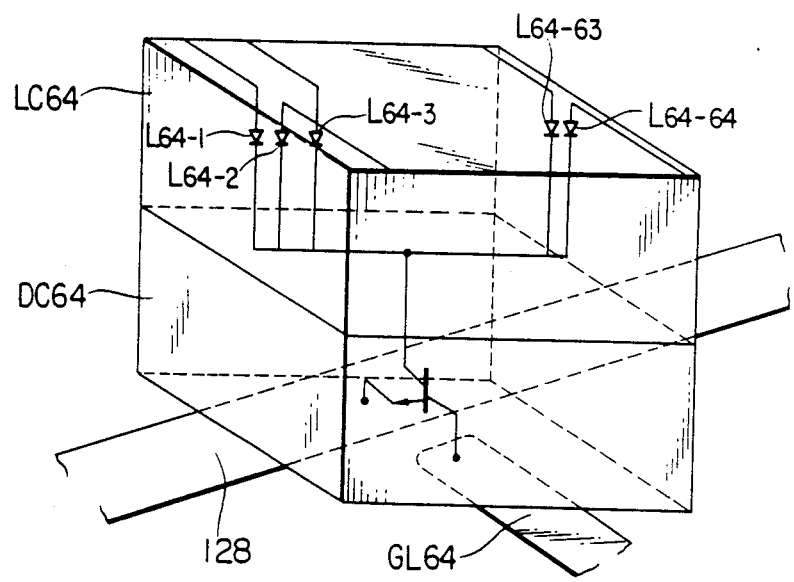
FIG. 20 is a view showing actual wirings of the LED chips and the switching elements shown in FIG. 19.

FIG. 20 shows the actual arrangement of connections between the LED chips LC1-LC64 and the switching elements DC1-DC64. On the lower face of each of the LED chips LC1-LC64 there are mutually connected cathodes of 64 LED's, and on the upper face of each of the switching elements DC1-DC64 composed of NPN transistors there is formed the collector electrode of said element. Thus, the LED chips LC1-LC64 are superposed on the switching elements DC1-DC64 to respectively connect said connectors with the cathodes. The emitters and bases of the switching elements DC1-DC64 are formed on the lower faces thereof, and are respectively connected to the grounding bus 128 and the gate signal lands GL1-GL64.

The LED array printer head of the above-described structure can be driven by the driving circuit shown in FIG. 5. The driving currents of the LED's L1-1-L64-64 collectively constitute a large driving current, which however is collected by the grounding bus 128 through the switching elements DC1-DC64. Consequently dynamic drive of the LED's L1-1-L64-64 can be achieved with large currents by merely forming the grounding bus 128 with a cross section enough for accepting the above-mentioned driving current, and the gate signal lands GL1-GL64 and the bondings Wb1-Wb64 connected thereto can be made with materials accepting only small currents.

As explained in the foregoing, there is provided an image forming apparatus in which plural image forming means are divided into blocks each containing a determined number of said image forming means and are driven in successive manner in each block by means of switching means, wherein high-speed and high-quality image formation is enabled by dynamic drive with an increased driving current in each image forming means, by the use of a structure in which a block of the image forming means is placed on the switching means to form connections therebetween.

In the foregoing embodiments, the LED's may be replaced by other recording elements such as an ink jet printer head or a liquid crystal array shutter.

Now there will be explained an embodiment capable of eliminating defects resulting from the dynamic drive of plural LED's.

In the dynamic drive method, the lighting time of each LED constituting a line becomes shorter as the number of LED's in dynamic drive block increases. Consequently, in order to achieve high-density image recording with a high image quality, it is necessary to prolongate the image recording time per line or to increase the light intensity of each LED.

However, the former method is undesirable for achieving high-speed image recording. Also in the latter method, the light intensity of LED has a certain limit and an excessively large driving current curtails the service life of LED.

These difficulties can be overcome by a sixth embodiment of the present invention to be explained in the following in relation to FIGS. 21 and 22, which enables image formation with a high image quality, without any loss in the recording speed.

Figure 21:
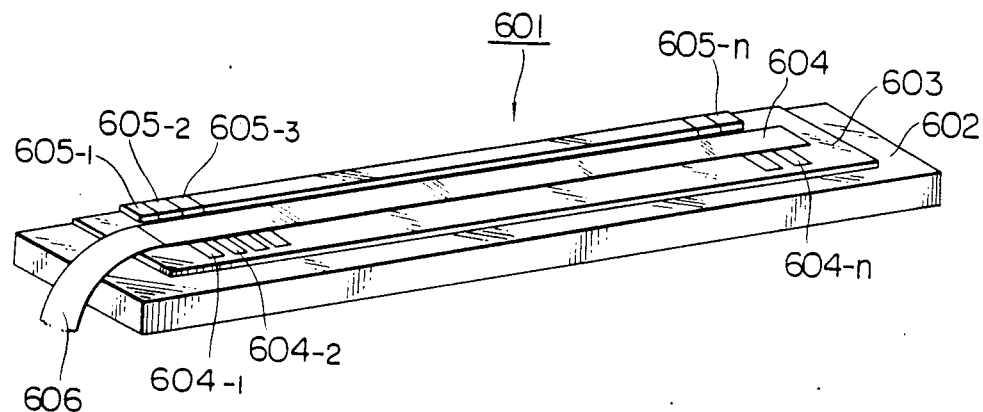
FIG. 21 is a perspective view of a sixth embodiment of the LED array of the present invention.

FIG. 21 is a perspective view of an LED array substrate 601, wherein provided are a substrate 602 functioning also as a heat radiating fin; support means 603 for group selecting signal lines, composed for example of a ceramic substrate; support means 604 for segment signal lines; group selecting electrodes 604-1-604-N; LED array chips 605-1-605-N, each provided, at an end thereof, with plural LED's 701 emitting light from an end face thereof; and a cable 606 containing segment signal lines connected to said support means 604.

Figure 22:
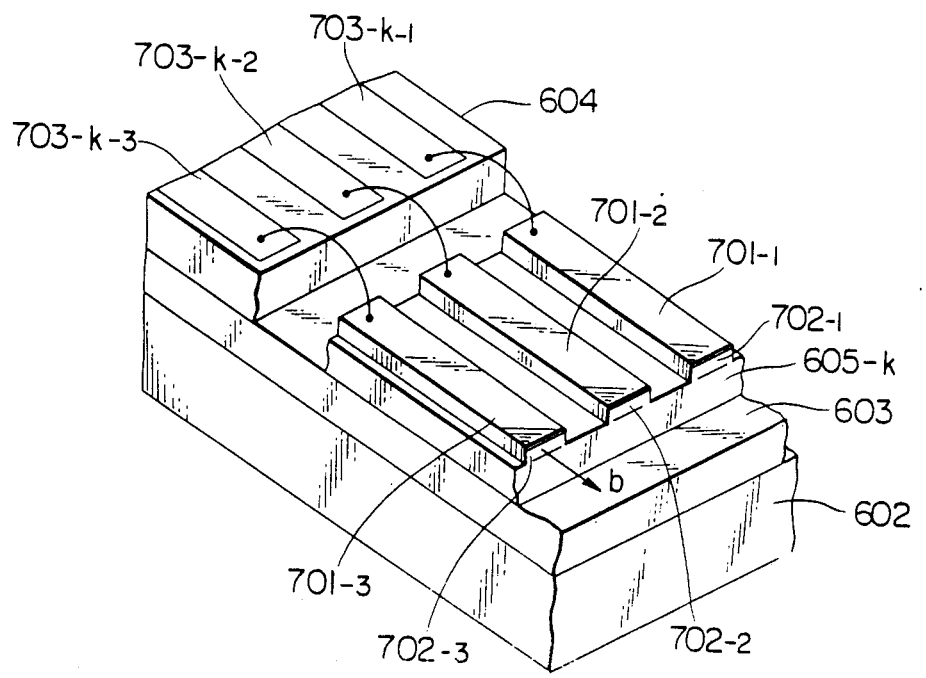
FIG. 22 is a partial magnified perspective view of the LED array board.

FIG. 22 is a magnified view of the vicinity of the LED array chip 605-$k$ of the substrate 601.

Said chip 605-$k$ is composed of a monolithic LED chip containing a linear array of LED's 701-1, 701-2, . . . emitting light from an end face thereof, wherein the plane of PN junction is parallel to the plane of adhesion between the LED array chip 605-$k$ and the support means 603 for the group selecting signal lines, and the light is emitted in a direction of arrow b from the light-emitting faces 702-1, 702-2, . . . . The electrodes of the LED's 701-1, 701-2, . . . are positioned on the upper faces thereof, and are bonded through wires with segment signal leads 703-$k$-1, 703-$k$-2, . . . on the support means 604, while the group selecting electrode 604-k is connected with the LED array chip 605-k through the aforementioned support means 603. In case of using such LED 701 emitting light from an end face wherein the direction of light emission is parallel to the plane of adhesion between the LED array chip 605 and the support means 603, the electrodes cannot be formed on both sides, so that the segment signal lines are connected, from one side only, to an end of each LED 701 in said chip 605. However the support means 603, 604 can be of the same type as explained before, except that the wirings are formed only on one side. It is to be noted, however, the density of the leads 703 for the segment signals is doubled for a same pixel density.

Such LED of the type emitting light from the end face can be formed in plural units on a chip by forming a PN junction by a liquid phase growth method, then forming the electrode over the entire surface and forming grooves to completely separate the electrode and the PN junction. Light is generated at said PN junction by applying a voltage across the electrode of the LED 701-k and the plane of adhesion of the LED array chip 605-k, but the light is emitted from the plane 702-k since the upper face is totally covered.

The formation of plural LED's, emitting light from the upper face as in the conventional LED array, on a chip has had to depend on the gaseous phase growth process, in combination with GaAsP of a poor light emitting efficiency.

In contrast, in the LED array chip 605 employed in the present embodiment, plural light-emitting faces 702-1, 702-2, ... are formed by splitting the PN junction of the LED 701 as shown in FIG. 22. Plural LED's need not be formed on the chip by means of the gaseous growth process but can be formed by splitting, with grooves, the PN junction of a large LED array chip 605 of the type emitting light from the end face, prepared by the liquid growth process. It is therefore rendered possible to obtain uniform LED array with a preferable material such as GaAlAs showing a higher light emitting efficiency, and such LED can be operated with an efficiency several times higher, or with a current several times smaller in order to obtain a same light intensity. In addition, the light emitting efficiency can be further improved by about 10 times if the emission wavelength is selected to ca. 750 nm with GaAlAs, so that a photosensitive drum of a sensitivity of 1 $\mu J/cm^2$ can be employed at said emission wavelength. Thus, in case of driving 37 LED groups each containing 128 LED's arranged at a pixel density same as shown in FIG. 5, by means of the control circuit shown in FIG. 5, a print same as obtained with the conventional technology can be obtained with a light intensity several tens of times smaller than that in the conventional art. More specifically, for printing an A3-sized sheet within ca. 4 seconds, the current per LED in the present embodiment can be of the order of 1–2 mA or even lower, in contrast to a current of 30 mA per LED in the conventional technology. Also high-speed switching is easy to achieve since the current in the group selecting signal lines does not exceed ca. 250 mA.

Figure 23:
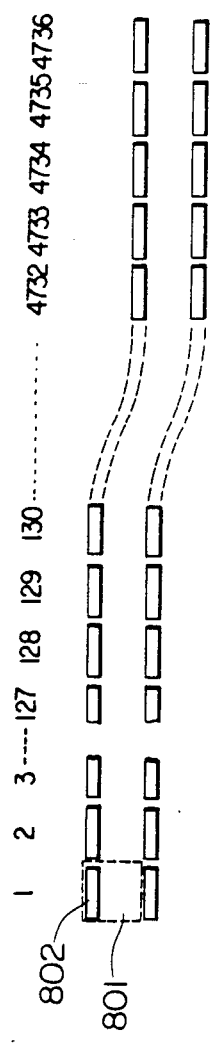
FIG. 23 is a schematic view showing conventional dot formation.

It is to be noted, however, that the light-emitting face 702 is longer in the direction of array than in the perpendicular direction. Because of the end face emission type, the width of the light-emitting face in a direction perpendicular to the direction of array is about equal to the thickness of the PN junction, with a half-peak width of the light intensity being in the order of 10 $\mu m$. Said width can only be widened to ca. 15 $\mu m$ even if the spot on the drum is blurred through an optical system. On the other hand, for a high pixel density of 16 pixels/mm, a single dot still has a minimum dimension of 62.5 $\mu m$. In case of a drive divided into 37 groups under mutual displacement of said LED array and the photosensitive drum 101 at a constant relative speed, the amount of said displacement amounts only to ca. 1.7 $\mu m$ in the direction perpendicular to the direction of array while a block of the LED's 701 is activated. Therefore, even when all the LED's are turned on, the irradiation is received, as shown in FIG. 23, only by an area 82 corresponding to ca. ¼ of the pixel area 801 encircled by a broken line. For this reason a white streak is generated in a black area in case of a printer wherein an area exposed to light turns black, and a black streak appears in a white area in case of a printer wherein an exposed area remains white.

In order to avoid such difficulty, in the present embodiment, at the simultaneous formation of m pixels with a time-divided drive into n, the period of simultaneously generating m pixels is selected not equal to 1/n of the period required for forming the pixels in a line but equal to or less than $1/(j \times n)$, wherein j is an integer equal to or larger than 2, so that the formation of pixels of a line is conducted by simultaneous formation of m pixels in an n-divided period, said procedure being repeated j times.

Figure 24:
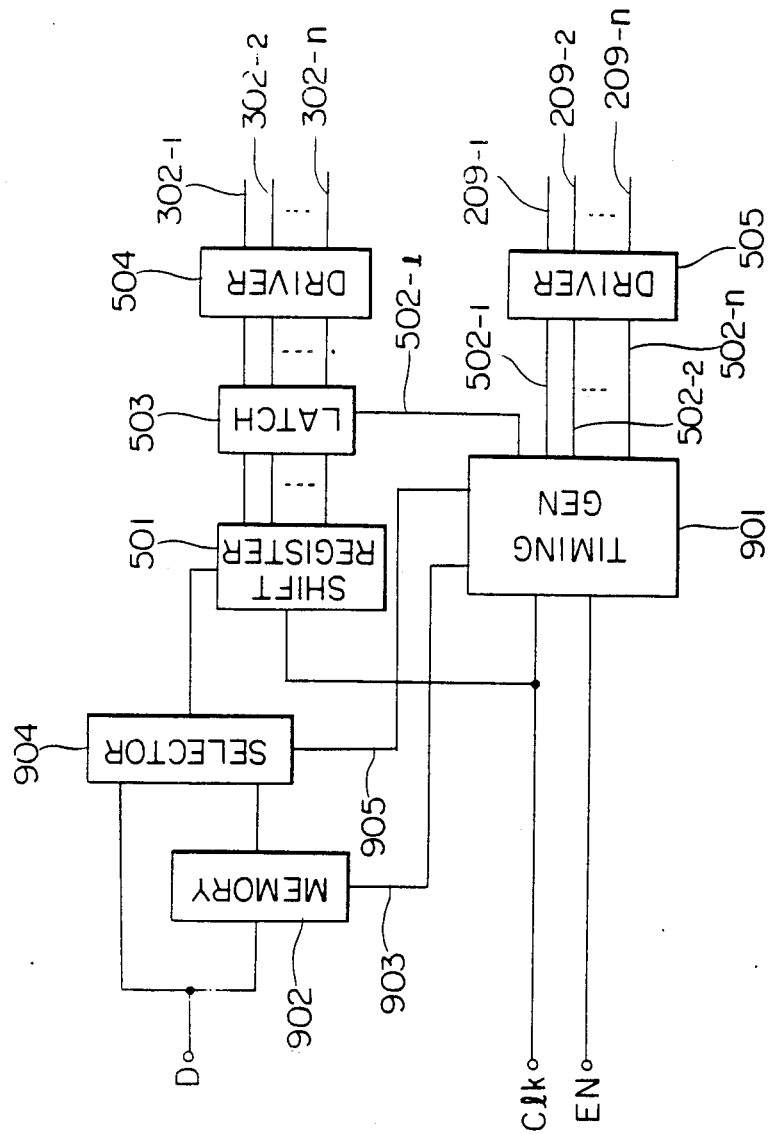
FIG. 24 is a block diagram of an LED array driving circuit for use in said embodiment.

FIG. 24 shows an example of the LED array driving circuit which satisfies the above-mentioned requirement.

In case of forming the pixels of a line in said circuit through simultaneous formation of m pixels in an n-divided period, with a number of repetition j for example equal to 4, the data signals D of a line are supplied in synchronization with clock signals CLK while a data enable signal EN is at the level "1", in continuous manner for a period not exceeding ¼ of the data signal transmission period for a line. A timing generator 901 supplies a memory 902 with a control signal for controlling the addressing, signal read-out and write-in, and a selector 904 with a control signal 905 for selecting either the data signals D or the data from the memory 902. The output signal from said selector 904 is supplied to a serial-in terminal of a shift register 501. The remaining part is equivalent to the driving circuit shown in FIG. 5.

At the start of the data enable signal EN, the timing generator 901 supplies the memory 902 with a control signal to clear the address to "0", and also supplies a control signal 905 to shift the selector 904 toward the data signals D. Then ¼ of the image is formed simultaneously with the storage of the data of a line into the memory 902 in synchronization with the clock signals CLK, through the increments of address from the timing generator 901. When said enable signal EN turns to "0", the timing generator 901 resets the address to "0" and shifts the control signal 903 to the signal read-out mode. Also the control signal 905 to the selector 904 is so shifted as to receive the output signals from the memory 902. Upon completion of the signal read-out from the memory 902, the address is again reset to "0", thereby reading the output of a line from the memory 902.

Figure 25:
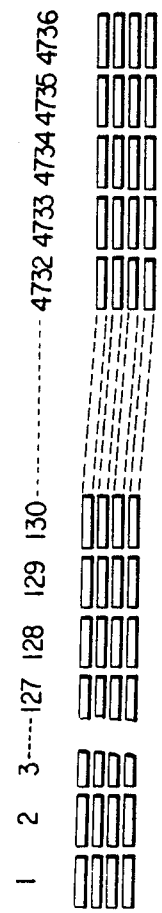
FIG. 25 is a schematic view showing an image formed by said embodiment.

In this manner the image data of a line are stored in the memory 902 and are then read repeatedly from said memory 902, thereby forming the image pixels of a line through the procedure of forming m pixels simultaneously in a n-divided period. Thus there is obtained a satisfactory image without black or white streaks, as shown in FIG. 25.

Figure 26:
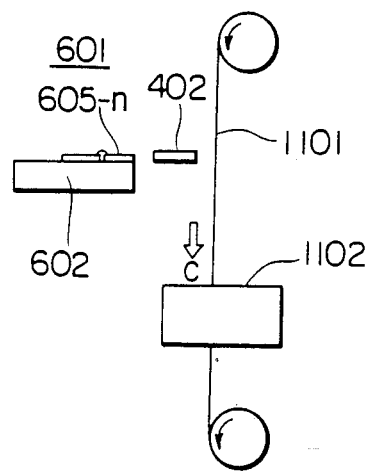
FIG. 26 is a schematic view of a printer constituting another example of said embodiment and adapted for focusing the light from the LED array onto a photosensitive sheet through an imaging optical system.

FIG. 26 shows another structure of the present embodiment, wherein an LED array substrate 601, having end-face emitting LED array chips 605-1–605-N on a substrate 602, is provided opposite to a photosensitive sheet 1101, and an imaging optical system 402 is utilized to focus the image of the light-emitting faces of the LED array chips 605-1–605-N onto the photosensitive sheet 1101. Said sheet 1101 is moved in a direction of arrow c, whereby an image is formed in consecutive manner by the spots formed by selective activation of the LED light-emitting faces 702 on said substrate 601. A developing unit 1102 develops and fixes the photosensitive sheet 1101 exposed to the image by said substrate 601.

The foregoing explanation indicates that the present embodiment is applicable not only in an electrophotographic printer but also in any printer in which the image is formed by exposure to light and is subjected to developing and fixing steps if necessary. Particularly a photosensitive material of a low sensitivity cannot be used in combination with the LED array printer head because of the deficient light intensity, but such difficulty can be resolved by the use of the LED array printer head of the present invention.

Figure 27:
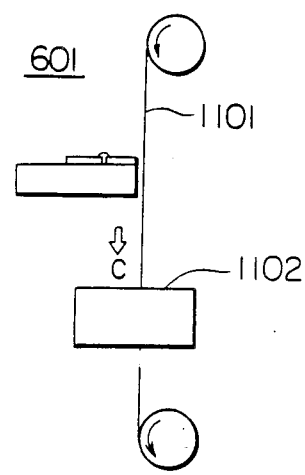
FIG. 27 is a schematic view of a printer constituting still another example of said embodiment and adapted for direct exposure.

FIG. 27 shows still another structure of the present embodiment, wherein the imaging optical system shown in FIG. 26 is eliminated and the LED array substrate 601 is maintained in contact with or in the vicinity of the photosensitive sheet 1101, whereby the photosensitive sheet 1101 is directly exposed to the activation pattern of the light-emitting faces 702.

In the electrophotographic process, particularly employing a photosensitive drum or belt, the toner eventually remaining on the photosensitive drum tends to be deposited on the light-emitting face 702, thus deteriorating the performance thereof, if the LED array substrate 601 is brought into contact or maintained in proximity. However such drawback does not occur when the photosensitive sheet 1101 is directly exposed in the present embodiment, and the absence of the imaging optical system 402 allows to provide a still cheaper printer.

However, if the photosensitive sheet 1101 has a coarse surface, the light-emitting face 702 may be damaged by the friction with the photosensitive sheet 1101.

Figure 28:
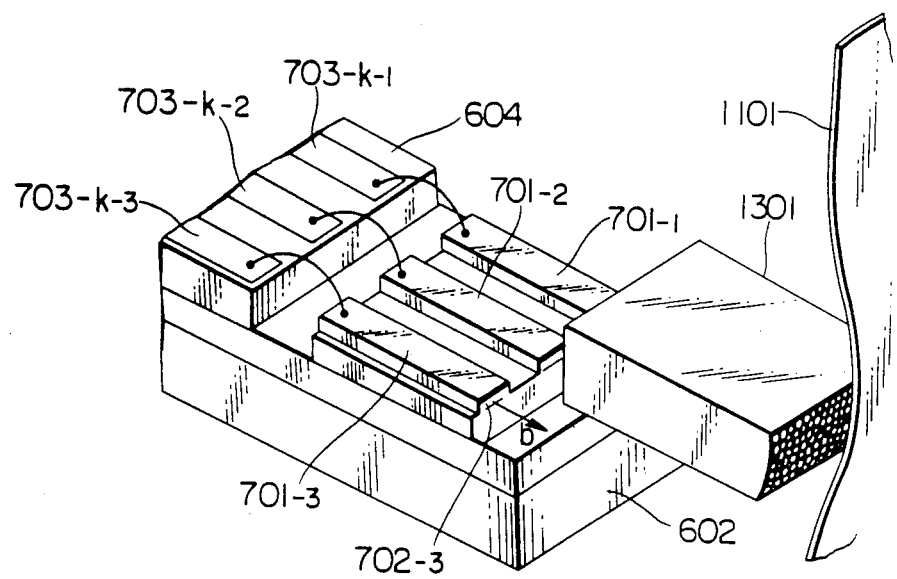
FIG. 28 is a schematic perspective view of a printer utilizing a fiber plate.

In case of employing a photosensitive sheet 1101 with a coarse surface or an LED array made of an easily damaged material, there may be employed, as shown in FIG. 28, a fiber plate 1301 for guiding the light from the light-emitting face 702 to the photosensitive sheet 1101.

On the other hand, in case of employing an LED array in a printer for recording a dot image on a microfilm or the like, the light-emitting face should be made very small in order to utilize an imaging optical system such as a rod lens array.

Since the size of the image is generally reduced to 1/20 in a microfilm, there is required a dot density of ca. 320 dots/mm on the film, in order to attain a dot density of 16 dots/mm when the image on the microfilm is blown back to the original size. However such high-density LED array cannot be realized at the moment, and can only be realized by reducing the light-emitting faces of the LED's through a reduction optical system, and exposing the microfilm to thus reduced image.

Figure 29:
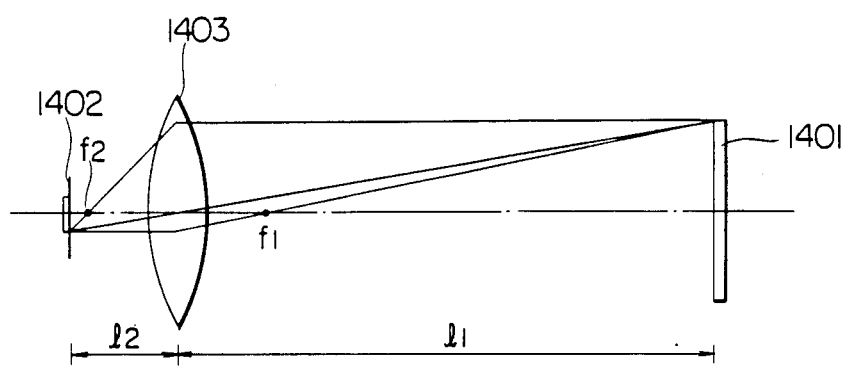
FIG. 29 is a schematic view showing an example of the reduction optical system of said embodiment and illustrating the relation between the LED in the printer and the image point on the photosensitive film.

FIG. 29 shows the relation of an LED 1401 and a photosensitive film 1402 in order to achieve the above-described structure.

The focal points of a reduction optical system are represented by f1 and f2. The light from the light-emitting face 1401 of an LED, positioned at a distance l1 from said optical system at the side of f1, is focused onto a photosensitive film 1402 positioned at a distance l2 at the opposite side f2 with respect to the aforementioned optical system 1403. Said light-emitting face 1401 has a small dimension of several tens of micrometers in the subscanning direction, i.e. a direction perpendicular to the direction of array, but has a size as long as several hundreds of micrometers in the main scanning direction. In case the reduction optical system 1403 is composed of lenses, there is required a very large lens for effectively focusing the light from the LED array, since there should be formed an inverted and reduced image of the entire row of the LED array. Thus the LED array can also be utilized in optical printers even for certain fields in which the recording with the LED array has been difficult because of the very low utilization efficiency of the emitted energy even in combination with photosensitive films of very high sensitivities utilizing silver halide technology.

As explained in the foregoing, it is rendered possible, in the formation of image pixels of a line, to obtain satisfactory image quality without black or white streaks with an LED array printer head emitting light from the end face thereof, by activating m pixels thereof simultaneously in an n-divided period twice or more times. It is also rendered possible to form a linear line more exactly perpendicular to the sub-scanning direction, to have a wider selection of materials in preparing the LED array thereby achieving a higher light emitting efficiency, to obtain an LED array of a higher intensity by the use of the light emission from the end face, and to obtain a high-speed LED printer through the use of an inexpensive time-divided driving circuit.

The LED array printer head of the present invention is easily applicable to the printers in which optical recording has been difficult.

It is to be noted the printer head of the foregoing embodiment is applicable not only to the recording of the output of computer, word processor etc. but also as a printer of digital copier.

What I claim is:

1. An image recording apparatus comprising:
    recording means including a plurality of light emission diodes arranged in a line, wherein each diode emits light in parallel with a junction face thereof;
    shift means for shifting a recording medium vertically to the line direction;
    drive means for driving each of said plurality of light emission diodes, respectively, on the basis of input image data; and
    control means for controlling said drive means to drive each said light emission diode in a line plural times with the same respective image data while shifting the recording medium so that the same line image data is recorded plural times by the light emission diodes in a line on the shifted positions, in recording medium.

2. An image recording apparatus according to claim 1, further comprising a photosensitive member for forming a latent image in response to the light emitted from said plurality of light emission diodes.

3. An image recording apparatus according to claim 1, wherein said plurality of light emission diodes are driven in a time-divided driving manner for every unit of a determined number of said light emission diodes.

4. An image recording apparatus according to claim 1, wherein said control means controls said plural recording times for the same image data to complete the shape of recorded picture elements.

5. An image recording apparatus according to claim 1, further comprising an image reader for reading the image, wherein the image data read by said image reader is recorded.

6. An image recording apparatus according to claim 1, wherein said control means includes a memory for storing said image data and wherein the same image data is recorded a plural number of times by repeatedly reading out the image data from said memory for driving said light emission diodes on the basis of said image data.

7. An image recording apparatus according to claim 6, wherein said control means performs the recording operation as the image data is recorded in said memory, and then said plural recordings are achieved by reading out the image data from said memory.

8. An image recording apparatus according to claim 6, wherein said memory has a memory capacity of one line.

9. An image recording apparatus comprising:
recording means including a plurality of light emission diodes arranged in a line, wherein each diode emits light in parallel with a junction face thereof;
shift means for shifting a recording medium vertically to the line direction;
driving means for driving each of said plurality of light emission diodes, respectively, on the basis of input image data; and
control means for controlling said drive means to correct the shape of a pixel recorded by each of the light emission diodes in a line.

10. An image recording apparatus according to claim 9, wherein said control means controls said drive means to drive each said light emission diode in a line a plurality of times with the same respective image data while shifting the recording medium so that the same line image data is recorded a plurality of times by the light emission diodes in a line on the shifted positions of the recording medium.

11. An image recording apparatus according to claim 10, further comprising a photosensitive member for forming a latent image in response to the light emitted from said plurality of light emission diodes.

12. An image recording apparatus according to claim 10, wherein said plurality of light emission diodes are driven in a time-divided driving manner for every unit of a predetermined number of said light emission diodes.

13. An image recording apparatus according to claim 10, wherein said control means controls said plurality of recording times for the same image data to complete the shape of recorded picture elements.

14. An image recording apparatus according to claim 10, wherein said control means includes a memory for storing said image data and wherein the same image data is recorded a plurality of times by repeatedly reading out the image data from said memory for driving said light emission diodes on the basis of said image data.

15. An image recording apparatus according to claim 14, wherein said control means performs the recording operation as the image data is recorded in said memory, and then said plurality of recordings are achieved by reading out the image data from said memory.

* * * * *

UNITED STATES PATENT AND TRADEMARK OFFICE
CERTIFICATE OF CORRECTION

PATENT NO. : 4,706,130
DATED : November 10, 1987
INVENTOR(S) : TADASHI YAMAKAWA

It is certified that error appears in the above-identified patent and that said Letters Patent is hereby corrected as shown below:

COLUMN 2
    Line 19, "lead" should read --head--.

COLUMN 4
    Line 16, "in" should read --is--.

COLUMN 5
    Line 49, "addition the" should read --addition to the--.

COLUMN 6
    Line 11, "to a" should read --to have a--.
    Line 23, "be" should read --is in a--.

COLUMN 13
    Line 11, "olines" should be --lines--.
    Line 56, "Tr1$c$-TR64$c$" should read --Tr1$c$-Tr64$c$--.
    Line 59, "Tr1$e$-Tr64$b$" should read --Tr1$e$-Tr64$b$--.

COLUMN 14
    Line 9, "WB1-Wb64" should read --Wb1-Wb64--.
    Line 13, "accomodate" should read --accommodate--.
    Line 21, "TR1$f$-Tr64$f$" should read --Tr1$f$-Tr64$f$--.

UNITED STATES PATENT AND TRADEMARK OFFICE
CERTIFICATE OF CORRECTION

PATENT NO. : 4,706,130

DATED : November 10, 1987

INVENTOR(S) : TADASHI YAMAKAWA

Page 2 of 2

It is certified that error appears in the above-identified patent and that said Letters Patent is hereby corrected as shown below:

Line 43, "cross sectional" should read --cross-sectional--.

Line 55, "Wb1-WB64" should read --Wb1-Wb64--.

Line 62, "date" should read --gate--.

COLUMN 21

Line 35, "driving means" should read --drive means--.

Signed and Sealed this

Sixteenth Day of August, 1988

Attest:

DONALD J. QUIGG

Attesting Officer

Commissioner of Patents and Trademarks